(12) United States Patent
Ben Letaief et al.

(10) Patent No.: US 7,965,641 B2
(45) Date of Patent: Jun. 21, 2011

(54) ROBUST COOPERATIVE SPECTRUM SENSING FOR COGNITIVE RADIOS

(75) Inventors: Khaled Ben Letaief, Hong Kong (CN); Wei Zhang, Hong Kong (CN)

(73) Assignee: Lingna Holdings Pte., LLC, Wilmington, DE (US)

( * ) Notice: Subject to any disclaimer, the term of this patent is extended or adjusted under 35 U.S.C. 154(b) by 218 days.

(21) Appl. No.: 12/031,521

(22) Filed: Feb. 14, 2008

(65) Prior Publication Data
US 2009/0207735 A1 Aug. 20, 2009

(51) Int. Cl.
*G01R 31/08* (2006.01)

(52) U.S. Cl. ..... 370/237; 370/330; 370/342; 455/67.11; 455/509; 455/450

(58) Field of Classification Search .................. 370/237
See application file for complete search history.

(56) References Cited

U.S. PATENT DOCUMENTS

| | | | | |
|---|---|---|---|---|
| 7,376,507 | B1 * | 5/2008 | Daily et al. | 701/207 |
| 2007/0091998 | A1 * | 4/2007 | Woo et al. | 375/240.02 |
| 2008/0014880 | A1 * | 1/2008 | Hyon et al. | 455/161.1 |
| 2008/0165754 | A1 * | 7/2008 | Hu | 370/342 |
| 2008/0165880 | A1 * | 7/2008 | Hyon et al. | 375/267 |
| 2008/0166974 | A1 * | 7/2008 | Teo et al. | 455/67.11 |
| 2008/0192686 | A1 * | 8/2008 | Cho et al. | 370/329 |
| 2009/0149208 | A1 * | 6/2009 | Huttunen et al. | 455/509 |

OTHER PUBLICATIONS

Abbas et al. "Efficient Cooperative Spectrum Sensing in Cognitive Radio Networks", 2007, IEEE, pp. 1-5.*
Simeone et al. "Cooperation and Cognitive Radio", 2007, IEEE, pp. 6511-6514.*
Shridhar et al. "Cooperative Sensing among Cognitive Radios", 2006, IEEE, pp. 1658-1663.*
ZhangYu et al, "Cooperative Spectrum Sensing Technique", 2007, IEEE, pp. 1167-1169.*
M. A. McHenry, "NSF spectrum occupancy measurements project summary," Shared Spectrum Company Report, Aug. 2005. [Online] Available: http://www.sharedspectrum.com.
J. Mitola and Maguire, "Cognitive radio: Making software radios more personal," IEEE Pers. Commun., vol. 6, pp. 13-18, Aug. 1999.
S. Haykin, "Cognitive radio: brain-empowered wireless communications," IEEE J. Select. Areas Commun., vol. 23, pp. 201-220, Feb. 2005.
I. F. Akyildiz et al., "Next generation/dynamic spectrum access/cognitive radio wireless networks: a survey," Computer Networks, vol.

(Continued)

*Primary Examiner* — Ricky Ngo
*Assistant Examiner* — Rasheed Gidado
(74) *Attorney, Agent, or Firm* — Turocy & Watson, LLP

(57) ABSTRACT

The disclosed subject matter relates to communicatively coupled cognitive radio systems, devices, methodologies, or combinations thereof, facilitating improved utilization of unused portions of spectral bands by secondary users generally allocated to other primary users. This improved utilization can be achieved by cooperative spectrum sensing employing ST coding and/or SF coding for transmit diversity. Further, cooperative spectrum sensing can be improved by employing relay diversity with or without algebraic coding. It is illustrated that a threshold probability of false alarm can be reduced by applying transmit diversity with space time coding and/or space frequency coding. It is further illustrated that relay diversity can be employed to compensate for reduced sensing diversity order were some nodes in a cooperative spectrum sensing system cannot report directly. It is disclosed that algebraic coding can be combined with relay diversity to decrease the threshold probability of false alarm in relay diversity systems while maintaining high levels of sensing diversity order.

23 Claims, 16 Drawing Sheets

OTHER PUBLICATIONS

D. Cabric et al., "Spectrum sharing radios," IEEE Circuits and Systems Magazine, vol. 6, No. 2, pp. 30-45, 2006.

A. Ghasemi and Sousa, "Collaborative spectrum sensing for opportunistic access in fading environments," in Proc. IEEE Symp. New Frontiers in Dynamic Spectrum Access Networks (DySPAN'05), Baltimore, USA, Nov. 8-11, 2005, pp. 131-136.

E. Visotsky, "on collaborative detection of TV transmissions in support of dynamic spectrum sensing," in Proc. IEEE Symp. New Frontiers in Dynamic Spectrum Access Networks, Baltimore, USA, Nov. 8-11, 2005, pp. 338-345.

T. Weiss, "A diversity approach for the detection of idle spectral resources in spectrum pooling systems," in Proc. of the 48th Int. Sci. Colloquium, Ilmenau, Germany, Sep. 2003.

International Search Report and Written Opinion mailed Aug. 20, 2009 for PCT Application No. PCT/IB2009/005358, 13 Pages.

G. Ganesan and Y. G. Li, "Agility improvement through cooperation diversity in cognitive radio," in Proc. IEEE Global Communications Conference (GLOBECOM'05), St. Louise, Missouri, USA, Nov. 28-Dec. 2, 2005, vol. 5, pp. 2505-2509.

G. Ganesan and Y. G. Li, "Cooperative spectrum sensing in cognitive radio networks," in Proc. IEEE Symp. New Frontiers in Dynamic Spectrum Access Networks (DySPAN'05), Baltimore, USA, Nov. 8-11, 2005, pp. 137-143.

IEEE 802.22 Working Group on Wireless Regional Area Networks, http://www.ieee802.org/22/.

C. Cordeiro, K. Challapali, D. Birru, and Sai Shankar N, "IEEE 802.22: The first worldwide wireless standard based on cognitive radios," in Proc. IEEE Symp. New Frontiers in Dynamic Spectrum Access Networks (DySPAN'05), Baltimore, USA, Nov. 8-11, 2005, pp. 328-337.

D. Birru, V. Gaddam, C. Cordeiro, K. Challapali, M. Bellec, P. Pirat, L. Escobar, and D. Callonec, "A cognitive PHY/MAC proposal for IEEE 802.22 WRAN systems Part 1: The cognitive PHY," IEEE 802.22 document No. 22-05/0103r0, Nov. 2005. [Online] Available: http://www.ieee802.org/22/.

H. Urkowitz, "Energy detection of unknown deterministic signals," Proc. of IEEE, vol. 55, pp. 523-531, Apr. 1967.

J. Hillenbrand, T. Weiss, and F. K. Jondral, "Calculation of detection and false alarm probabilities in spectrum pooling systems," IEEE Commun. Lett., vol. 9, pp. 349-351, Apr. 2005.

V. I. Kostylev, "Energy detection of a signal with random amplitude," in Proc. IEEE Int. Conf. Commun. (ICC'02), New York, NY, Apr. 28-May 2, 2002, pp. 1606-1610.

F. F. Digham, M.-S. Alouini, and M. K. Simon, "On the energy detection of unknown signals over fading channels," in Proc. IEEE Int. Conf. Commun. (ICC'03), Anchorage, AK, USA, May 11-15, 2003, pp. 3575-3579.

S. M. Alamouti, "A simple transmit diversity technique for wireless communication," IEEE J. Select. Areas Commun., vol. 16, pp. 1451-1458, Oct. 1998.

A. Sendonaris, E. Erkip, and B. Aazhang, "User cooperation diversity—Part I: system description," IEEE Trans. Commun., vol. 51, pp. 1927-1938, Nov. 2003.

J. N. Laneman, D. N. C. Tse, and G. W. Wornell, "Cooperative diversity in wireless networks: efficient protocols and outage behavior," IEEE Trans. Inf. Theory, vol. 50, pp. 3062-3080, Dec. 2004.

H. Zhang and T. A. Gulliver, "Capacity and error probability analysis for orthogonal space-time block codes over fading channels," IEEE Trans. Wireless Commun., vol. 4, pp. 808-819, Mar. 2005.

V. Stankovic, A. Host-Madsen, and Z. Xiong, "Cooperative diversity for wireless ad hoc networks," IEEE Signal Processing Mag., vol. 23, pp. 37-49, Sep. 2006.

D. Huang, K. B. Letaief, and J. Lu, "A receive space diversity architecture for OFDM systems using orthogonal designs," IEEE Trans. Wireless Commun., vol. 3, pp. 992-1002, May 2004.

K. F. Lee and D. B. Williams, "A space-time coded transmitter diversity technique for frequency selecitve fading channels," in Proc. IEEE Sensor Array and Multichannel Signal Processing Workshop, Mar. 2000, pp. 149-152.

Y. Gong and K. B. Letaief, "An efficient space-frequency coded OFDM system for broadband wireless communications," IEEE Trans. Commun., vol. 51, pp. 2019-2029, Dec. 2003.

J. Boutros, and E. Viterbo, "Signal space diversity: a power and bandwidth efficient diversity technique for the Rayleigh fading channel," IEEE Trans. Inf. Theory, vol. 44, pp. 1453-1467, Jul. 1998.

H. E. Gamal, and M. O. Damen, "Universal space-time coding," IEEE Trans. Inf. Theory, vol. 49, pp. 1097-1119, May 2003.

W. Zhang, X.-G. Xia, and P. C. Ching, "High-rate full-diversity space-time-frequency codes for broadband MIMO blockfading channels," IEEE Trans. Commun., vol. 55, pp. 25-34, Jan. 2007.

Laneman, et al., "Distributed Space-Time-Coded Protocols for Exploiting Cooperative Diversity in Wireless Networks":, IEEE Transactions on Information Theory, Oct. 2003, vol. 49, pp. 2415-2425.

A. Sahai, N. Hoven, and R. Tandra, "Some fundamental limits on cognitive radio," in Proc. of Allerton Conf., Monticello, Oct. 2004.

Mishra et al.; "Cooperative Sensing among Cognitive Radios":, IEEE ICC2006 proceedings, Jun. 2006, vol. 4, pp. 1658-1663.

* cited by examiner

ROBUST COOPERATIVE SPECTRUM SENSING FOR COGNITIVE RADIOS

TECHNICAL FIELD

The various embodiments of the subject disclosure relate generally to radio systems, devices, methodologies, or combinations thereof, and more particularly to communicatively coupled cognitive radio systems, devices, methodologies, or combinations thereof, associated with determining and/or using spectral bandwidth facilitating improved utilization of said spectral bandwidth.

BACKGROUND

Growing numbers of people are wirelessly accessing systems such as the internet and cellular telephone systems. This can lead to congestion in the limited spectral region designated for these wireless communication systems. As a result of this congestion, access to these systems can be denied or throughput over these crowded bandwidths can be reduced. Effectively, there is only a finite amount of space in these parts of the radio spectrum. As more devices go wireless, e.g., not just laptops or cell phones, but sensor networks, radio frequency ID tags, and other devices, all these devices also have to share the finite and increasingly crowded spectrum. One solution to increase the utility of the limited spectrum is to increase the spectral efficiency of these limited windows of spectrum. Such attempts have been effective, but have a finite point where further improvements in efficiency become overly difficult to implement.

The problem is not a lack of total spectrum but rather is due to the way that total spectrum is allocated and used. Wherein the use of selected portions of total available spectrum is separately licensed to different primary users (e.g., television broadcast regions, commercial radio broadcast regions, emergency channel regions, etc.), secondary users can have limited access to these additional spectral regions, creating crowding in the limited spectral regions available to large numbers of users (e.g., Wi-Fi spectral regions, wireless telephone spectral regions, cellular telephone spectral regions, among other wireless communication systems). Thus, another solution is to use wider spectral regions by sharing unused portions of spectrum, licensed to primary users, with secondary users for wireless communications.

The Federal Communications Commission (FCC) in the United States (and similar agencies in other parts of the world, e.g., Ofcom in the United Kingdom) license or allocate spectrum in various bands, for example, AM radio, VHF television, cellular phones, citizen's-band radio, pagers, Wi-Fi, Bluetooth, and Walkie-Talkies, among others. However, where these bands of frequency are underutilized, traffic from more congested spectral regions can be shifted to make more efficient use of them. The FCC has determined that as much as 70% of the allocated spectrum may be sitting idle at a given location and time, even though that portion of spectrum has been allocated for use by a primary user, for example, cellular network bands can be overloaded while amateur radio and paging frequencies can be vastly underutilized. Where a particular spectral region's use changes over time and location, it is necessary to determine the use of that frequency by a primary user at each location and at each time before allowing a secondary user to access the same spectral region to avoid interference with the primary user's enjoyment of that particular spectral region.

Systems allowing secondary users to utilize bands allocated to primary users, whenever it would not cause any significant interference, are known as Cognitive Radio (CR) systems. CR systems are beginning to be developed and deployed through such efforts as the FCC making special allowances so that new types of wireless networks can test CR systems on unused television channels, and the Institute of Electrical and Electronics Engineers (IEEE) beginning standardization of CR protocols. Large electronics manufacturers, such as Intel, have also begun discussions and R&D efforts on producing reconfigurable radio hardware to facilitate CR system deployment.

Cognitive radio systems can generally be divided into two types, 1) Full Cognitive Radio (a.k.a., "Mitola radio" or "software radios") in which every possible parameter observable by a wireless node or network is taken into account, and 2) Spectrum Sensing Cognitive Radio in which typically only the radio frequency spectrum is considered. These two types can further be divided into licensed band (IEEE 802.22) and unlicensed band (IEEE 802.15) cognitive radios depending on their use of either licensed (privately allocated) spectrum or unlicensed (publicly allocated) spectrum, respectively.

One method of determining available spectrum is by employing an energy detector. The detection of available spectrum can facilitate potential use of that available spectrum by a secondary user. Cooperative spectrum sensing can be employed to determine available spectrum over larger areas by cooperatively detecting available spectrum across multiple energy detector locations and aggregating the results to facilitate determinations relevant to the area covered by the network of cooperating energy detectors. Generally, cooperative spectrum sensing is conducted through two successive stages: spectrum sensing (e.g., detecting signals transmitted from a primary user at each of a plurality of CRs) and decision reporting (e.g., transmitting decisions from the plurality CRs to a common receiver). The common receiver can then indicate that radios in the area covered by the plurality of energy detectors (e.g., CRs that comprise energy detectors) can employ the spectral region where it is not being occupied by the primary user.

Where cooperative spectrum sensing systems communicate over channels that are subject to interferences, conventional systems of cooperative spectrum sensing can be subject to missed detection and/or false reporting of spectral occupation. The various embodiments of the subject disclosure can provide avenues to improve reporting over "real world" communication channels to provide a more robust cooperative spectrum sensing environment. In contrast to convention systems, by employing space-time and/or space-frequency coding over communications channels, a virtual antenna can achieve transmit diversity. In further contrast to conventional systems, where an unreliable reporting channel can cause loss of sensing information from one or more nodes, relaying sensing information through other reporting components can maintain cooperative spectrum sensing through relay diversity. Moreover, relay diversity can further be made more robust by employing algebraic coding.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure.

Its sole purpose is to present some concepts of the disclosed subject matter in a simplified form as a prelude to the more detailed description that is presented later.

The subject various embodiments of the subject disclosure relate to cooperative spectrum sensing to facilitate utilization of underused radio spectrum for wireless communication. In one non-limiting embodiment, a system for facilitating cooperative spectrum sensing is provided that includes a sensor that can assess the occupation of a spectral band by primary user(s), such that the device can report information related to the assessed occupation of the spectral band and then a determination is made whether occupying the spectral band is appropriate with respect to primary usage of the spectral band, based at least in part on reported cooperative spectrum sensing information. Other embodiments are described below.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

DETAILED DESCRIPTION

Overview

Figure 1:
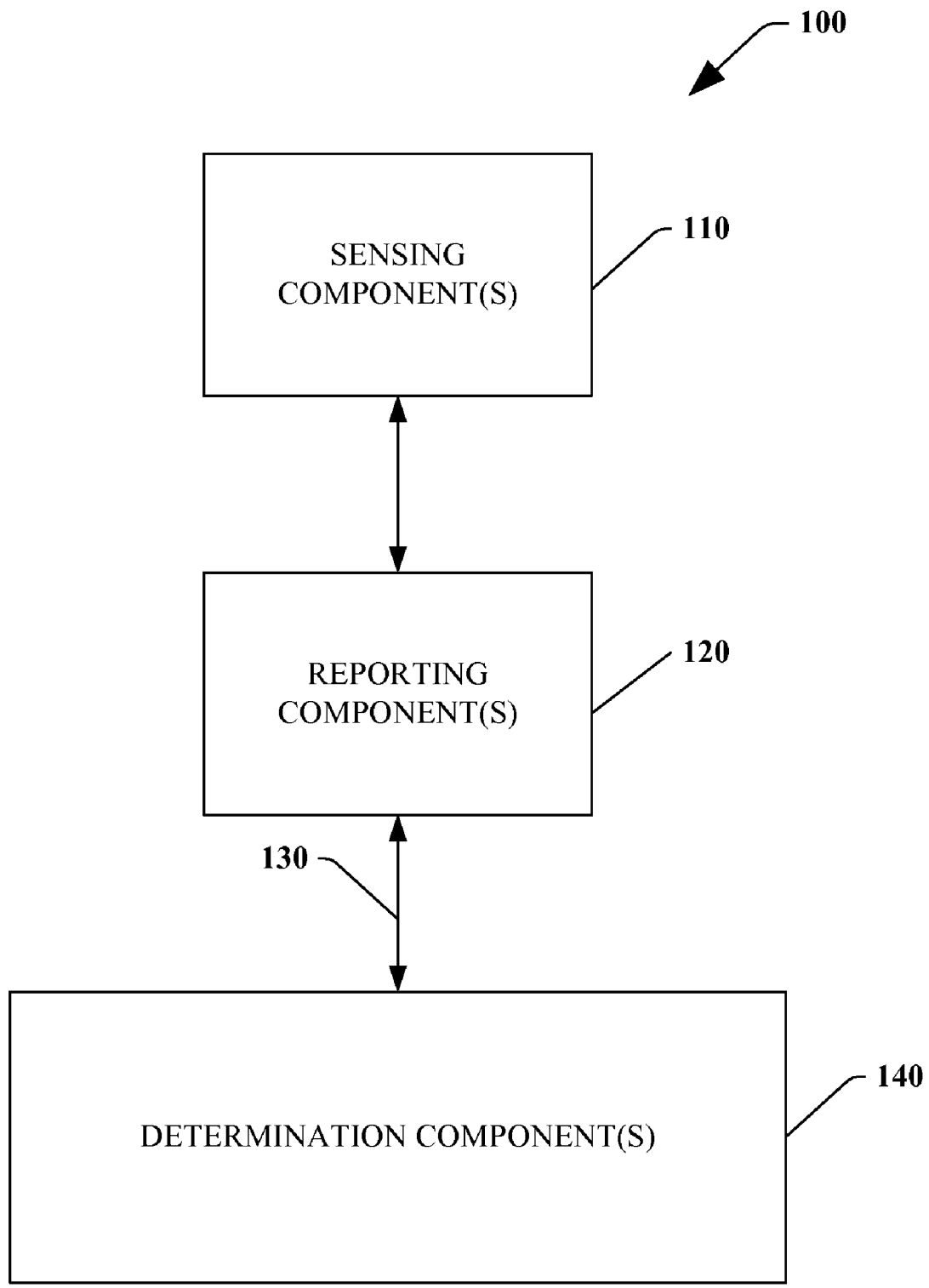
FIG. 1 is a diagram of a system that can facilitate determining the occupancy of a spectral band to aid in determining the availability of that spectral band in accordance with an aspect of the subject matter disclosed herein.

Radio frequency spectrum is generally allocated by governing bodies to primary users. These primary users can underutilize the allocated spectrum (e.g., unused VHF television broadcast spectrum, spectrum allocated to emergency response systems outside of an emergency condition, among other examples). Recent studies by the Federal Communications Commission (FCC) Spectrum Policy Task Force (SPTF) have demonstrated that the actual licensed spectrum is largely unoccupied most of the time. Another recent work on spectrum occupancy measurements showed that the average spectrum occupancy from 30 MHz to 3 GHz over six cities is 5.2% and that the maximum total spectrum occupancy is 13.1% in New York City. By employing the underutilized bandwidth of the allocated spectral regions, congestion on other bands of spectrum can be reduced.

Secondary user (SU) utilization of the underutilized bandwidth of the primary user (PU) should not interfere with the PU's enjoyment of the spectrum allocated to the primary user. Generally, a SU can be allowed to use spectral regions allocated to a PU only when the PU is not using the spectral region. To this end, the use of the PU spectra can be detected and analyzed to determine the feasibility of allowing SU use. Radio systems that determine the availability of underutilized spectrum are generally known as cognitive radios (CR). By sensing and adapting to the environment, a CR is able to fill in spectrum holes and serve its users (e.g., SUs) without causing harmful interference to the PU. The most efficient way to find the spectrum holes is to detect the primary receivers that are receiving data. However, this is not realistic because it is very difficult for CRs to measure the channel between the primary transmitter and primary receiver. Thus, CR generally performs spectrum sensing by focusing on the detection of the PU transmitter signal across a time and frequency window.

To facilitate detection of the PU transmitter signal, a CR can include a sensing component, for example, an energy detector. One of skill in the art will appreciate that a sensing component can be integrated into a CR or can be a separate component either internal or external to the CR and still provide the functionality as herein described and considered within the scope of the disclosed subject matter. The exemplary energy detector can measure the energy of a signal transmitted by a PU and received at the sensing component, over a predetermined bandwidth and for a predetermined period of time. Factors such as transmission frequency, the distance from the transmitter, interfering signals, and/or physical interference can affect the detection of the PU transmission at the sensing component.

Cooperative spectrum sensing can improve determination of the PU occupation of a spectral window by aggregating separate determinations from a plurality of distributed sensing components. For example, a first sensing component may not sense the PU transmission because it is, for example, shadowed by a building, whereas a second sensing component that is not shadowed can determine that the PU is using the allocated spectral region. By fusing these two pieces of information from the sensing components, it can be determined that a SU should not be allowed to use the bandwidth because the PU is using it at that moment in time. Were the data not fused, the determination of the first sensing component could have resulted in a determination that the PU was not occupying the spectrum and a SU transmission can have undesirably interfered with the PU's transmissions.

In another aspect, cooperative spectrum sensing generally communicates local sensing results relating to spectrum use to other components by way of a reporting component to facilitate determinations of available spectrum for SU use. The analytical detection of available spectrum through cooperative spectrum sensing is generally limited by the presence of interference in the reporting transmission channels. Reporting channels can be subject to interference and fading associated with a probability of reporting error ($P_e$). One method of overcoming this limitation is to employ a transmit diversity based cooperative spectrum sensing method wherein multiple energy detectors (e.g., energy detectors in CRs) are treated as a virtual antenna array. Thus, the $P_e$ can be reduced by employing transmit diversity. Transmit diversity can include space-time (ST) coding over flat fading channels and space-frequency (SF) coding over frequency-selective fading channels.

To facilitate the implementation of ST coding, each sensing component in a cluster can communicate with other sensing components in the cluster to form a virtual antenna approximating a spatially diverse antenna. By determining proper decoding of transmitted reporting data at neighboring sensing components, a degree of confidence can be associated with a ST coded transmission of such data to a receiving component. Where this confidence is sufficiently high, ST coding can be employed, while where there is not sufficient confidence, alternative transmission forms can be employed, for example, using TDMA protocol.

SF coding can be implemented to achieve a transmit diversity gain over frequency-selective fading channels. Sensing components in a cluster can each transmit reporting information by SF coding transmissions over a plurality of orthogonal frequency division multiplexing (OFDM) subchannels. Thus, a plurality of reporting information is simultaneously transmitted on a plurality of OFDM subchannels allowing for a corresponding diversity gain over single subchannel OFDM transmissions. Where SF coding is unfeasible, alternative transmission forms can be employed, for example, using FDMA protocol.

An additional limitation in cooperative spectrum sensing can be related to shadowing or obliteration of reporting channels. For example, a reporting sensing component may be unable to report to a common receiver where a large building is between the reporting sensing component and the common receiver. To overcome this limitation, a relay diversity based cooperative spectrum sensing method can be employed to increase the diversity of detection when some sensing components experience problematic reporting channels to a common receiver. Relay diversity can allow a sensing component with a poor reporting channel to report by relaying the reporting information through a different sensing component having a better reporting channel. Further improvements can be achieved by employing algebraic coding, a signal constellation rotation technique, in combination with relay diversity based cooperative spectrum sensing methods to facilitate improved cooperative spectrum sensing performance.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter can be practiced without these specific details. In other instances, well-known structures and devices are illustrated in block diagram form in order to facilitate describing the various embodiments of the subject disclosure.

Robust Cooperative Spectrum Sensing for Cognitive Radios

As mentioned, conventionally, cooperative spectrum sensing is conducted through spectrum sensing (e.g., detecting signals transmitted from a primary user at each sensing component) and decision reporting (e.g., transmitting reporting information related to the spectrum sensing to a common receiver). A sensing component can detect the presence of a primary user (PU) transmission for a spectral range over a period of time. Spectrum sensing can determine what portions of a spectral window are occupied and are thus unavailable for secondary user (SU) occupation. Where there is available space in the spectrum, SU transmissions can be facilitated. By using available bandwidth on PU spectral bands, traffic on more congested spectra can be reduced.

Where a sensing component has gathered information relating to the occupation of a spectral band, the information can be reported to a central receiver. The central receiver can form a determination about secondary use of a spectral band based in part on aggregated reported information from one or more sensing components. The decision reporting channels can be subject to error, for example interference, shadowing, flat-fading, and/or frequency-selective fading, among other degrading effects. Empirically, cooperative spectrum sensing is limited by the probability of reporting error ($P_e$) resulting from imperfect reporting channels. Where reporting channels are imperfect there can be failures to report between a sensing component and a central receiver and/or erroneous reports received by a central receiver (e.g., a "false alarm").

Systems, devices, and/or methods that can facilitate a reduction in $P_e$ are presented. Transmit diversity can be employed in cooperative spectrum sensing to reduce $P_e$, and can improve the application of cooperative spectrum sensing in relation to more efficient use of available spectrum. Space-time (ST) coding and/or space-frequency (SF) coding can be employed across a plurality of sensing components forming a cluster that reports to a central receiver. Further, relay diversity can be employed to facilitate maintaining the benefits of cooperative spectrum sensing where one or more reporting channels is sufficiently degraded to substantially interfere with reporting over that channel. Relay diversity can be further improved by employing algebraic coding.

A network of sensing components can be comprised of K sensing components and a common receiver. Generally the common receiver manages the network of sensing components. One possible example of such a network is a network of cognitive radios (CRs) each comprising a sensing component and a reporting component. In this example, one CR in the CR network can act as a central receiver and can manage the other CRs in the CR network. Thus, where the sensing component in outlying CRs sense that a PU spectral band is in use, and this information is reported to the central receiver, the central receiver can instruct the CRs in the network not to transmit in the PU spectral band and thus can prevent the CR network from interfering with the PU's allocated spectrum. Similarly, if the outlying CRs do not sense that the PU is occupying the spectral band, the central receiver can instruct that the CR network utilize the unused spectrum. This example is consistent with the IEEE 802.22 working group model.

Generally spectrum sensing can be divided into sensing a signal or not sensing a signal as represented at the $i^{th}$ sensing component for a time-invariant channel as:

$$x_i(t) = \begin{cases} n_i(t), & H_0 \\ h_i s(t) + n_i(t), & H_1 \end{cases} \quad (1)$$

where $x_i(t)$ is the observed signal at the $i^{th}$ sensing component, $s(t)$ is the PU signal, $n_i(t)$ is the additive white Gaussian noise (AWGN), $h_i$ is the complex channel gain of the sensing channel between the PU and the $i^{th}$ sensing component, $H_0$ corresponds to a signal not being transmitted from the PU, and $H_1$ corresponds to a signal being transmitted from a PU. The energy collected in the frequency domain is denoted by $E_i$, where:

$$E_i = \begin{cases} \chi^2_{2u}, & H_0 \\ \chi^2_{2u}(2\gamma_i), & H_1 \end{cases} \quad (2)$$

where $\chi^2_{2u}$ denotes a central chi-square distribution with $2u$ degrees of freedom and $\chi^2_{2u}(2\gamma_i)$ denotes a noncentral chi-square distribution with $2u$ degrees of freedom and a non-centrality parameter $2\gamma_i$, where $\gamma_i$ is the instantaneous signal to noise ratio (SNR) of the received signal at the $i^{th}$ sensing component and $u=TW$, where $T$ is a time window and $W$ is bandwidth.

Thus, for the $i^{th}$ sensing component, the average probability of a false alarm ($P_{f,i}$), the average probability of detection ($P_{d,i}$), and the average probability of missed detection ($P_{m,i}$) over Rayleigh fading channel are given by, respectively:

$$P_{f,i} = E_{\gamma_i}[\text{Prob}\{E_i > \lambda_i \mid H_0\}] = \frac{\Gamma\left(u, \frac{\lambda_i}{2}\right)}{\Gamma(u)}, \quad (3)$$

$$P_{d,i} = E_{\gamma_i}[\text{Prob}\{E_i > \lambda_i \mid H_1\}] \quad (4)$$

$$= e^{-\frac{\lambda_i}{2}} \sum_{n=0}^{u-2} \frac{1}{n!}\left(\frac{\lambda_i}{2}\right)^n + \left(\frac{1+\gamma_i}{\gamma_i}\right)^{u-1} \times$$

$$\left[ e^{-\frac{\lambda_i}{2(1+\gamma_i)}} - e^{-\frac{\lambda_i}{2}} \sum_{n=0}^{u-2} \frac{1}{n!}\left(\frac{\lambda_i \gamma_i}{2(1+\gamma_i)}\right)^n \right],$$

and $$P_{m,i} = 1 - P_{d,i}, \quad (5)$$

where $\lambda_i$ and $\bar{\gamma}_i$ denote the energy threshold and the average SNR at the $i^{th}$ sensing component, respectively. $E_{\gamma_i}[\ldots]$ represents the expectation over the random variable $\gamma_i$. $\Gamma(\ldots,\ldots)$ is the incomplete gamma function and $\Gamma(\ldots)$ is the gamma function.

Turning to the figures, FIG. 1 illustrates a system 100 that can facilitate determining the occupancy of a spectral band to aid in determining the availability of that spectral band for use, for example, by a cognitive radio. System 100 can comprise a sensing component 110 that can sense the occupation of a spectral band. For example, the sensing component 110 can be an energy detector for sensing the energy of a received signal in a bandwidth (W) over an observation time window (T) in accord with Eqs. 1-5, supra. The sensing component 110 can, for example, be included in a cognitive radio device (not illustrated) or can be a separate stand alone component. The sensing component 110 can sense when a PU is occupying a spectral band and can communicate this information by way of a reporting component 120.

System 100 can include a reporting component 120 to facilitate communicating information relating to the sensed occupation of a spectral band. Reporting component 120 can be, for example, included in a cognitive radio (not illustrated) or can be a separate stand alone component. In one aspect of the disclosed subject matter, the reporting component 120 can communicate information without encoding the information. For example, the reporting component 120 can directly transmit the spectrum sensing data acquired by the sensing component 110.

In another aspect of the disclosed subject matter, the reporting component 120 can encode or transform the information to facilitate more efficient and/or robust reporting. For example, a determination relating to the occupation of a spectral band can be made, for example, as a 1-bit binary determination of occupation or non-occupation, such that this determination of occupancy of the spectral band can be communicated by way of the reporting component 120 over a low bandwidth reporting channel. As a second example, the reporting component 120 can perform coding of communicated information, for example, ST coding, SF coding, or algebraic coding, among others, as described herein, to facilitate transmit and/or relay diversity as also described herein.

System 100 can further inherently include a reporting channel 130 to facilitate communicating information relating to the sensed occupation of a spectral band. The reporting channel can be a wired connection, wireless connection, or combination thereof. For example, the reporting channel 130 can be a radio link. As a second example, the reporting channel 130 can be an Ethernet cable or other physical wired connection. As a third example, the reporting channel 130 can be a networked connection, for example, through the internet, comprising wired, wireless, optical, and/or other types of connections. Where the reporting channel 130 is frequently selected to be a wireless radio channel, the reporting channel 130 can generally be considered non-perfect and subject to noise and other interference (though generally, any form of reporting channel 130, including wired and others, will be imperfect at some level). Further, the reporting channel 130 can comprise a plurality of channels and/or combinations of channel types.

System 100 can comprise a determination component 140 that can receive communications passed from the reporting component 120 by way of the reporting channel 130. The determination component 140 can aggregate or fuse the information communicated thereto to facilitate determining the feasibility of using a spectral band, for example, by a SU. Where spectral information from the sensing component 110 is communicated to the determination component 140, the aggregation or fusing of the information can be termed data fusion. Where spectral information from the sensing component 110 is communicated in a transformed state, for example as a binary determination of spectral band occupancy, as disclosed supra, the aggregation or fusion can be termed decision fusion. Further, where information is transmitted as a mix of data and decisions from a plurality of sensing components 110, transmitted data can be transformed into decisions at the determination component 140 before decision fusion occurs.

Determinations related to spectral band occupancy made at the determination component 140 can generally be employed in determining the appropriateness of a SU employing the spectral band without interfering with the PU's use of the spectral band. Thus, for example, where a PU is not transmitting on an allocated frequency, this can be sensed by a sensing component 110, transformed into a binary indicator of spectral vacancy, and reported by a reporting component 120 over a reporting channel 130 to a determination component 140, wherein the determination component 140 can determine, based at least in part on the sensing information, that it is appropriate for a SU to transmit on the PU's allocated frequency without interfering with the PU's use of the frequency. Similarly, for example, where a PU is transmitting on an allocated frequency, this can be sensed and communicated to form a determination that, based at least in part on the sensing information, it is inappropriate for a SU to transmit on the PU's allocated frequency.

The determination component 140 can be included in a cognitive radio or be a separate stand alone component. Generally, where multiple devices (e.g., cognitive radio devices in a cognitive radio network, see FIG. 2) each comprise sensing components 110, reporting components 120, and/or determination components 140, one device (e.g., a cognitive radio) will function as a central receiver or base station for receiving information from the other devices (e.g., other cognitive radios in the network cell) to facilitate data fusion or decision fusion relating to a determination relating to the appropriateness of employing a spectral band (e.g., using a PU's spectrum where it would not interfere with the PU's use of the spectrum). Further, system 100 can be deployed in a single layer, hierarchical structure, or a combination thereof, such that determination components can either be the sole source for determining appropriateness of spectral occupation, or can function to make local level determinations that are relayed to higher level determination components 140 for further data fusion or decision fusion and higher level determinations of appropriateness of spectral occupation.

Figure 2:
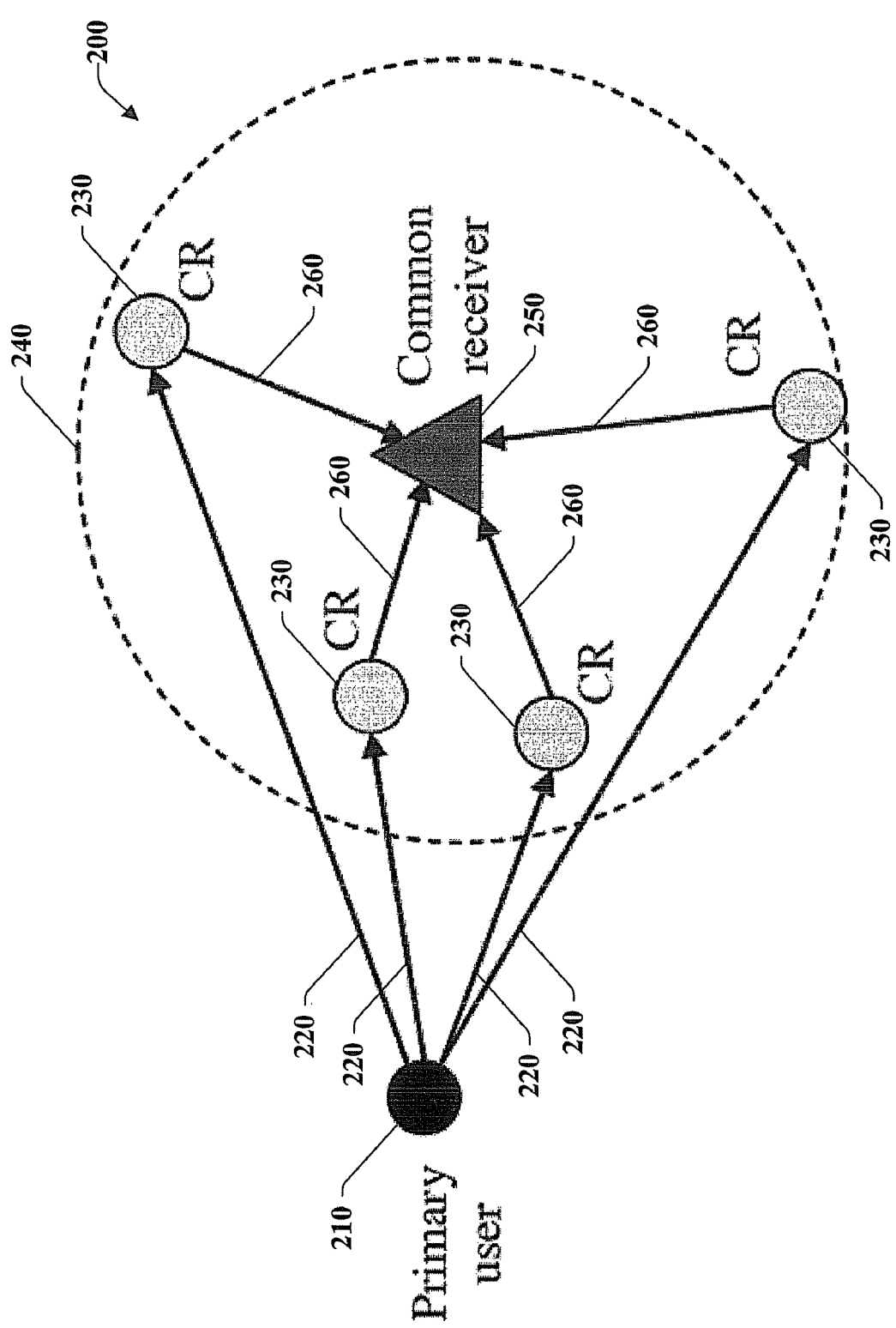
FIG. 2 is a schematic diagram of a network of cognitive radios in accordance with an aspect of the disclosed subject matter.

Referring to FIG. 2, depicted is a schematic diagram of a network 200 of cognitive radios in accordance with an aspect of the disclosed subject matter that can facilitate determining the occupancy and appropriateness of using a spectral band allocated to a primary user. A primary user (PU) 210 can be allocated a spectral band that can be employed for transmissions 220. The transmissions, or lack thereof, can be detected by cognitive radios 230 (e.g., the cognitive radios can include sensing components the same as, or similar to, sensing component 110) to facilitate determinations related to the availability of the PU spectrum for SU use. The cognitive radios 230 can form a network cell 240 within the larger network 200. The cognitive radios 230 in the network cell 240 can communicate 260 (e.g., by reporting through a reporting component the same as, or similar to, reporting component 120 by way of a reporting channel the same as, or similar to, reporting channel 130) to a common receiver 250. The common receiver 250 can include a determination component the same as, or similar to, determination component 140. The common receiver 250 can be itself a cognitive radio taking on the functionality of a common receiver 250 to determine the appropriateness of SU use of the PU spectral band by the cognitive radios 230 within the network cell 240. Network 200 illustrates the concept of cooperative sensing wherein, for example, a plurality of cognitive radios 230 communicates information relating to occupation of a spectral band to a common receiver 250 to facilitate determining the appropriateness of SU use of the PU spectrum, based at least in part on the communicated spectrum information.

Figure 3:
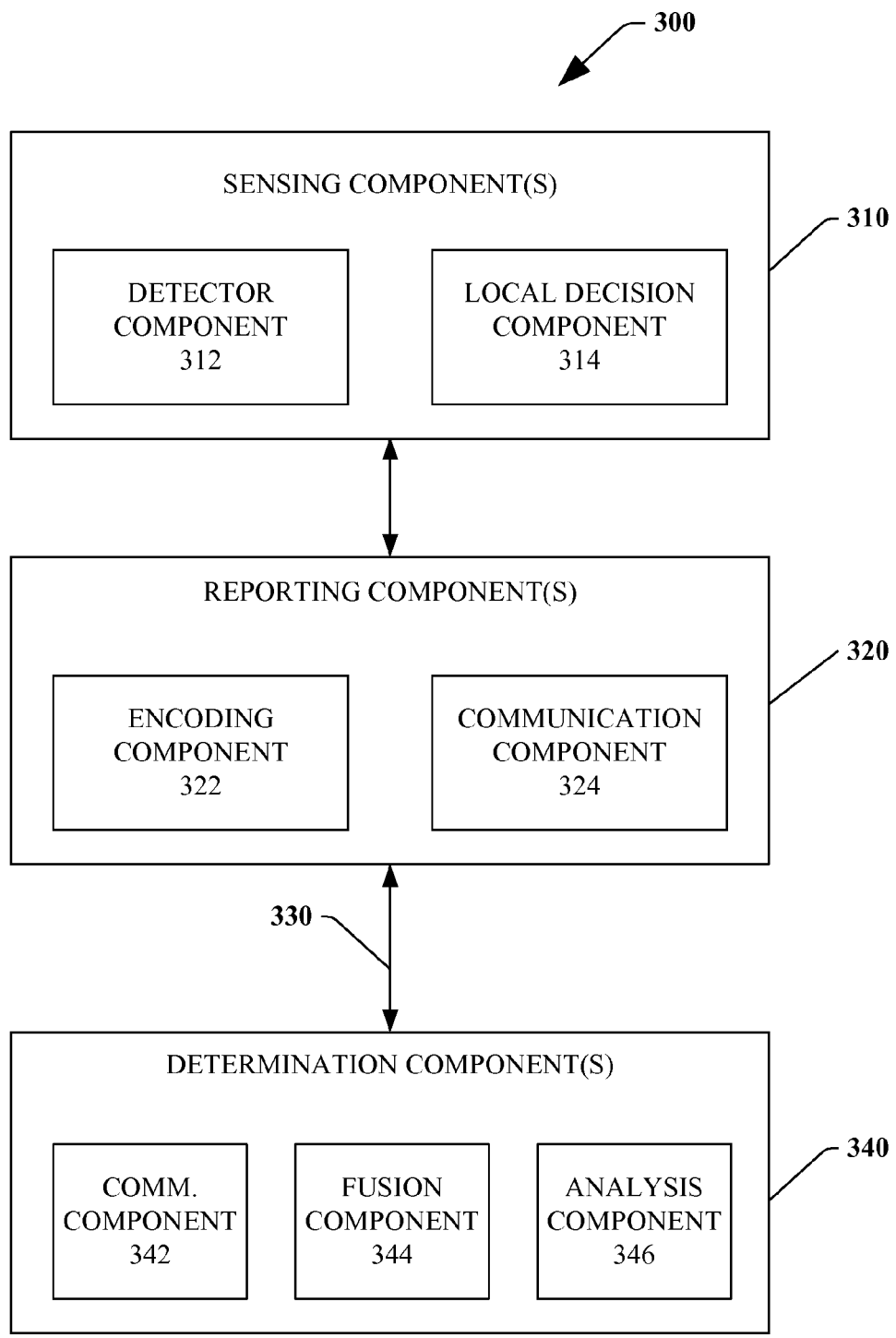
FIG. 3 is a diagram of a system that can facilitate determining the occupancy of a spectral band to aid in determining the availability of that spectral band in accordance with an aspect of the subject matter disclosed herein.

Turning to FIG. 3, illustrated is a diagram of a system 300 that can facilitate determining the occupancy of a spectral band to aid in determining the availability of that spectral band in accordance with an aspect of the subject matter disclosed herein. Sensing component 310 can be the same as, or similar to, sensing component 110. Sensing component 310 can include a detector component 312 that can detect the presence or absence of a transmission for a time window T and a spectral bandwidth W. Sensing component 310 can further include a local decision component 314 that can facilitate forming a local decision about the occupancy of the spectral band sensed by the detector component 312. For example, the local decision component 314 can form a binary determination about the occupancy of a spectral band such that $\{-1\}$ indicates that a spectral band is not occupied and $\{1\}$ indicates that a spectral band is occupied.

System 300 can further include a reporting component 320 that can be the same as, or similar to, reporting component 120. Reporting component 320 can facilitate determining the occupancy of a spectral band by communicating information related to the occupancy of a spectral band as sensed by sensing component 310. For example, data relating to occupancy of the spectral band sensed by sensing component 310 can be communicated over reporting channel 330 (which can be the same as, or similar to, reporting channel 130) for data fusion as described herein. As a second example, data relating to the occupancy of the spectral band sensed by sensing component 310 can be passed through the local decision component 314 and the resulting decision can then be communicated over reporting channel 330 for decision fusion as described herein. Reporting component 320 can include an encoding component 322 to encode reporting transmissions to facilitate transmit and/or relay diversity in a cooperative spectrum sensing system as described herein (e.g., ST coding, SF coding, algebraic coding, . . . ). Reporting component 320 can further include a communications component 324 to facilitate reporting over reporting channel 330.

System 300 can further include a determination component 340 that can be the same as, or similar to, determination component 140. Determination component 340 can facilitate determining the occupancy of a spectral band by receiving communicated information related to the occupancy of a spectral band as sensed by one or more sensing component(s) 310. The determination component 340 can include a communication component 342 that can be the same as, or similar to, communications component 324. The communications component 342 can facilitate receiving reports over reporting channel 330. Data or decisions reported to the determination component 340 can be fused into a more useful form in a fusion component 344 that can be included in the determination component 340. Determination component 340 can include an analysis component 346 to analyze the reported information directly and/or reported information fused through data fusion and/or decision fusion. A determination can thus be formed regarding the appropriateness of occupying a spectral band based at least in part on the presence or absence of another user on the spectral band (e.g., the PU occupying the spectral band).

The analysis performed by way of the analysis component 346 can further include forming inferences about the occupancy of the spectral band. These inferences can be based, at least in part, on information related to the sensing component 310. Further, the sensing information can be combined with other information to form an improved inference relating to the occupancy of the spectral band based on, for example, historic use, time of day, day of week, weather conditions, emergency conditions, geographic information, priority levels, or combinations thereof, among many other types of information.

In cooperative spectrum sensing, sensing information from a plurality of sensing components (110, 310) can be communicated to a common receiver 250 (e.g., a cognitive radio functioning as a base station, WLAN/WAN access point, . . . ) to facilitate determining the appropriateness of using a spectral band allocated to a PU, based at least in part on the PU occupying the spectral band. For example, where a network 200 of cognitive radios 230 measure the licensed spectrum of a PU and each cognitive radio 230 makes a local binary decision relating to the PU occupying the spectral band, these decisions can be communicated to a common receiver 250 to facilitate a determination of appropriateness for a SU to use the PU's allocated spectral band. In this example, a $\{-1\}$ can be communicated to the common receiver 250 when the PU is not detected on the spectral band and a $\{1\}$ can be communicated to the common receiver 250 when the PU is detected on the spectral band.

Continuing with the example, the transmission of the decisions from all of the cognitive radios 230 to the common receiver 250 can be a treated as a multiuser access problem that can be performed using time division multiple access (TDMA) or frequency division multiple access (FDMA). Where there are K cognitive radios 230 in the network 200, the common receiver 250 can collect all K local decisions and make a final decision using an OR rule. Letting Z denote the decision statistic in the common receiver, Z can be described as:

$$Z \sim \begin{cases} \{H_0^{BS,1}, \ldots, H_0^{BS,K}\}, & \mathcal{H}_0 \\ \text{otherwise}, & \mathcal{H}_1 \end{cases} \quad (6)$$

where $\mathcal{H}_0$ and $\mathcal{H}_1$ denote the inferences drawn by the common receiver that the PU signal is not transmitted or transmitted, respectively. $H_0^{Bs,i}$ denotes the local decision of the $i^{th}$ cognitive radio that the PU is not occupying the spectral band for i=1, . . . , K. Thus, accordingly, the common receiver 250 can infer that the PU signal is not being transmitted (e.g., the PU is not occupying the spectral band) where all cognitive radios 230 infer the absence of the PU in the spectral band. Similarly, the common receiver 250 will therefore infer that the PU is occupying the spectral band where one or more cognitive radios 230 indicate that that a PU signal is present.

A false alarm (e.g., indication that he PU is occupying the spectral band when in fact the PU is not occupying the spectral band) can occur with a probability of $Q_f$ in a cooperative spectrum sensing system as disclosed herein, where:

$$Q_f = \text{Prob}\{\mathcal{H}_1 | \mathcal{H}_0\} = 1 - \text{Prob}\{\mathcal{H}_0 | \mathcal{H}_0\} = 1 - \Pi_{i=1}^K (1 - P_{f,i}) \quad (7)$$

wherein $P_{f,i}$ denotes the false alarm probability of the $i^{th}$ cognitive radio 230 in local spectrum sensing. Further, the missed detection probability of cooperative spectrum sensing is given by:

$$Q_m = \text{Prob}\{\mathcal{H}_1 | \mathcal{H}_1\} = \Pi_{i=1}^K P_{m,i} \quad (8)$$

where $P_{m,i}$ denotes the missed detection probability of the $i^{th}$ cognitive radio 230 for local spectrum sensing. Thus, where every cognitive radio 230 achieves identical $P_f$ and $P_m$ for local spectrum sensing:

$$Q_f = 1 - (1 - P_f)^K \quad (9a)$$

and $$Q_m = (P_m)^K \quad (9b)$$

where $P_f = P_{f,i}$ and $P_m = P_{m,i}$ for i=1, . . . , K. Therefore the probability of detection for cooperative spectrum sensing would then be:

$$Q_d = 1 - Q_m = 1 - (1 - P_d)^K \quad (9c)$$

where $P_d = P_{d,i}$ for i=1, . . . , K.

Figure 4:
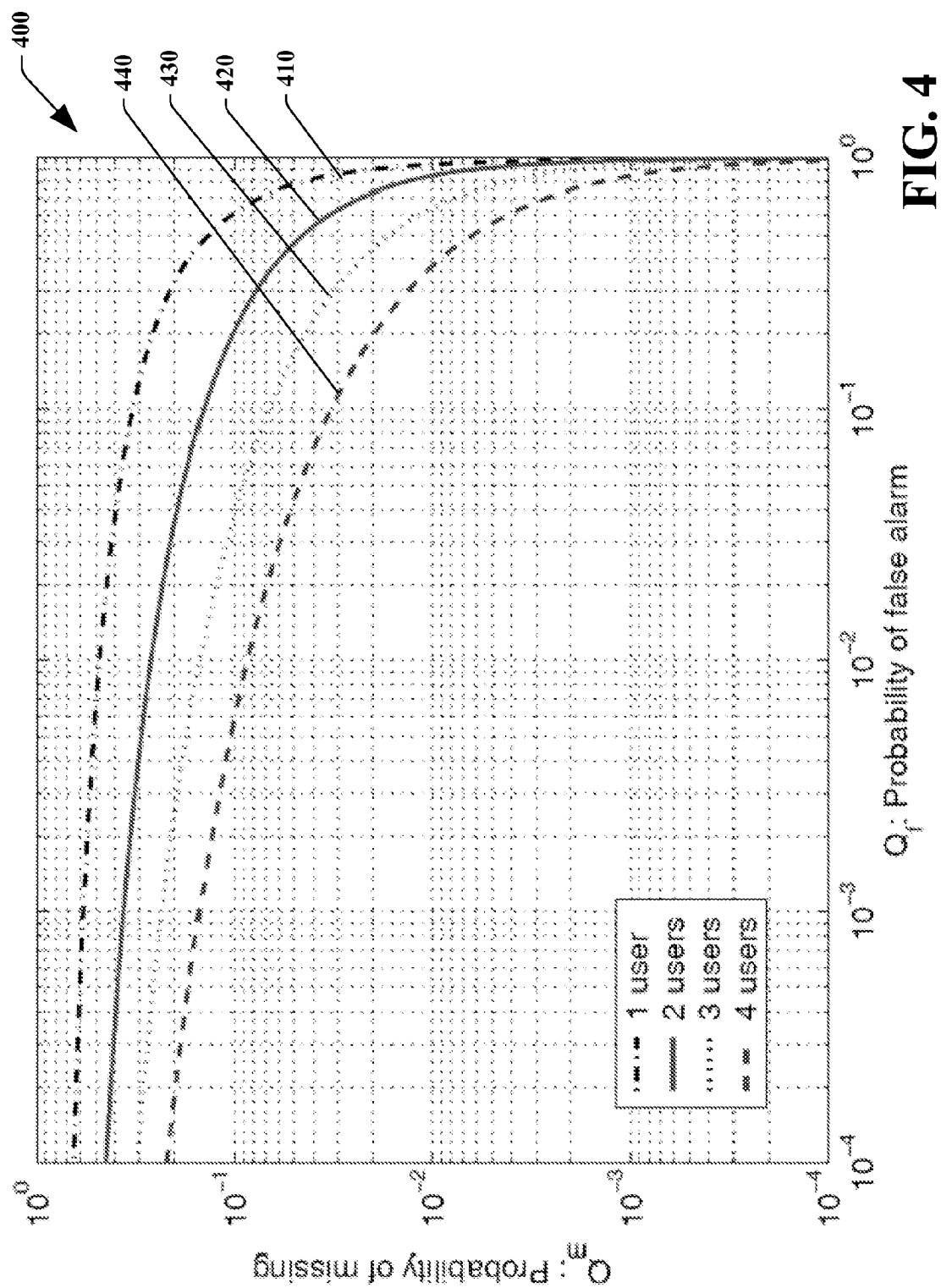
FIG. 4 is a plot of the performance results of cooperative spectrum sensing for different numbers of users (e.g., sensing components) over Rayleigh fading channels with a SNR $\bar{\gamma}$=10 dB in accordance with an aspect of the subject matter disclosed herein.

Referring to FIG. 4 illustrated is a plot 400 of the performance results of cooperative spectrum sensing for different numbers of users (e.g., sensing components 110, 310) over Rayleigh fading channels with a SNR $\bar{\gamma}$=10 dB. By increasing the number of users (e.g., sensing components 110, 310, for example, cognitive radios 230) the probability of missed detection can be greatly reduced for any given probability of a false alarm. The term K can be referred to as the sensing diversity order of cooperative sensing because it characterizes the error exponent of $Q_m$ in Eq. 9b. At 410, the number of users is 1 (e.g., K=1). At 420, the number of users is 2 (e.g., K=2). At 430, the number of users is 3 (e.g., K=3). At 440, the number of users is 4 (e.g., K=4).

Continuing the previous example, where cooperative spectrum sensing is not reported over ideal reporting channels 130, 330, an error factor can be introduced into the ideal equations to account for imperfect reporting of sensing component 110, 310 information. Further, where reporting channels 130, 330 are imperfect, a decision recovery (e.g., ST decoding, SF decoding, algebraic decoding) aspect can be incorporated into a determination component 140, 340 such that encoded sensing component 110, 310 reports can be employed in determinations regarding the appropriateness of occupying a PU's spectral band.

Figure 5:
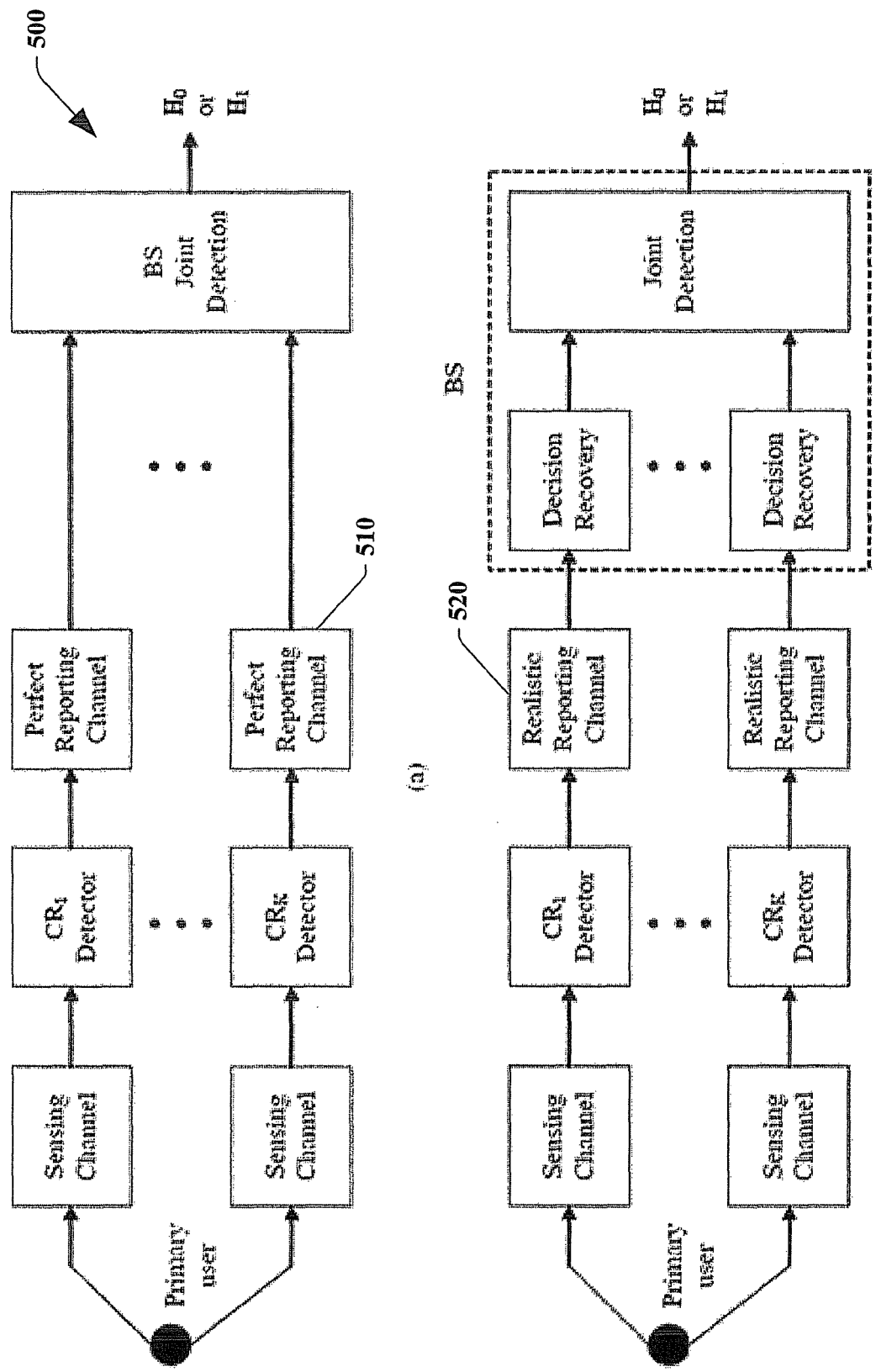
FIG. 5 illustrates a comparison between cooperative spectrum sensing with perfect reporting channels (a) and with imperfect reporting channels employing coding and recovery (b), in accordance with an aspect of the disclosed subject matter.

Turning to FIG. 5, depicted is a comparison 500 between cooperative spectrum sensing with perfect reporting channels 510 (the same as, or similar to, 130, 330) and with imperfect reporting channels 520 (the same as, or similar to, 130, 330) employing coding and recovery, in accordance with an aspect of the disclosed subject matter. Imperfect reporting channels 130, 330 can result from interference, fading, or shadowing, among other factors. In one aspect of the disclosed subject matter, where the reported decision is either $H_0=\{-1\}$ or $H_1=\{1\}$, the determination component 140, 340 in a common receiver (e.g., BS in FIG. 5) can use a fixed threshold, such as $\{0\}$, for decision recovery of encoded reports sent across an imperfect reporting channel 130, 330 (realistic reporting channel 520 in FIG. 5). Further, where reporting is not encoded, decision recovery can be a process of recovering the corrupted signal, such as, filtering, binning, or thresholding, among other techniques.

Continuing the prior example, assuming that the common receiver (e.g., the base station (BS)) receives a corrupted local sensing report and the reporting is not encoded, the recovered corrupt signal at the determination component (e.g., BS in FIG. 5) can be $H_0^{BS}$ or $H_1^{BS}$ from a local spectrum sensing decision $H_0^{CR}$ or $H_1^{CR}$, respectively, performed at a sensing component 110, 310 and reported over an imperfect reporting channel 130, 330. Therefore, where the probability of reporting error for the $i^{th}$ cognitive radio 110, 310 (e.g., sensing component) is denoted as $P_{e,i}$ (e.g., the error probability of signal transmission over the reporting channels 130, 330 between the $i^{th}$ cognitive radio 230 and the common receiver 250) and where the reporting channel 130, 330 is a binary symmetric channel (BSC) having the error probability $P_{e,i}$, the probability of receiving $H_0$ (or $H_1$) at the common receiver 250 (after recovery) while $H_0$ (or $H_1$) is transmitted over the reporting channel 130, 330 is $P_{e,i}$ for the $i^{th}$ cognitive radio 230. Letting $X_1$, $X_2$ and $X_3$ be the indicator function for PU activity at PU, the cognative radio 230, and the common receiver 250, respectively, then $X_n$ (n=1,2,3) is a two-state Markov chain because $x_n \in \{H_0, H_1\}$, n=1,2,3. Moreover, the future process $X_3$, given the present $X_2$, is independent of the past $X_1$ because the received decision at the common receiver 250 depends on the local decision made by the local sensing component 110, 310 (e.g., cognitive radio 230) only, such that, $$\text{Prob}\{X_3=x_3|X_2=x_2, X_1=x_1\}=\text{Prob}\{X_3=x_3|X_2=x_2\}.$$

Further, letting $Q_f$ and $Q_m$ denote the probability of false alarm and probability of missed detection of cooperative spectrum sensing, respectively. Then:

$$Q_f = 1 - \Pi_{i=1}^{K}[(1-P_{f,i})(1-P_{e,i})+P_{f,i}P_{e,i}], \quad (10)$$

and $$Q_m = \Pi_{i=1}^{K}[P_{m,i}(1-P_{e,i})+(1-P_{m,i})P_{e,i}], \quad (11)$$

where $P_{f,i}$ and $P_{m,i}$ are the false alarm probability and missed detection probability of the local spectrum sensing for the $i^{th}$ cognitive radio 230 (e.g., sensing component 110, 310), respectively, because using the properties of the Markov chain we can obtain:

$$\text{Prob}\{H_0^{BS}|H_0^{PU},H_0^{CR}\}=\text{Prob}\{H_0^{BS}|H_0^{CR}\}=1-P_e, \quad (12)$$

and $$\text{Prob}\{H_0^{BS}|H_0^{PU},H_1^{CR}\}=\text{Prob}\{H_0^{BS}|H_1^{CR}\}=P_e, \quad (13)$$

where, for notational brevity, we let $H_j^{PU}$, $H_j^{CR}$, and $H_j^{BS}$ denote $X_1 H_j$, $X_2=H_j$, and $X_3=H_j$, respectively, for j=0,1.
Therefore, $$\text{Prob}\{H_0^{BS} \mid H_0^{PU}\} = \text{Prob}\{H_0^{CR} \mid H_0^{PU}\} \times \text{Prob}\{H_0^{BS} \mid H_0^{CR}\} + \quad (14)$$
$$\text{Prob}\{H_1^{CR} \mid H_0^{PU}\} \times \text{Prob}\{H_0^{BS} \mid H_1^{CR}\}$$
$$= (1-P_f)(1-P_e) + P_f P_e,$$

and likewise:

$$\text{Prob}\{H_0^{BS}|H_1\}=P_m(1-P_e)+(1-P_m)P_e. \quad (15)$$

Where a cognitive radio network 200 has K cognitive radios 230 (e.g., sensing components 110, 310), the decision statistic for cooperative spectrum sensing can be given by Eq. 6, and hence:

$$Q_f = \text{Prob}\{\mathcal{H}_1 \mid \mathcal{H}_0\} \quad (16)$$
$$= 1 - \text{Prob}\{H_0^{BS,1}, \ldots, H_0^{BS,K} \mid H_0\}$$
$$= 1 - \prod_{i=1}^{K} \text{Prob}\{H_0^{BS,i} \mid H_0\}.$$

Likewise, $$Q_m = \text{Prob}\{\mathcal{H}_1 \mid H_1\} \quad (17)$$
$$= 1 - \text{Prob}\{H_0^{BS,1}, \ldots, H_0^{BS,K} \mid H_1\}$$

$$= \prod_{i=1}^{K} \text{Prob}\{H_0^{BS,i} \mid H_1\}.$$

Wherein Eq. 14 can be substituted into Eq. 16 to yield Eq. 10 and Eq. 15 can be substituted into Eq. 17 to yield Eq. 11.

Therefore, if the local spectrum sensing conducted at cognitive radio i results in $P_f i = P_f$ and $P_m, i = P_m$ for all i=1, ..., K, and the probabilities of reporting error are identical for all cognitive radios 230 (e.g., sensing components 110, 310), then:

$$\begin{cases} Q_f = 1 - ((1-P_f)(1-P_e) + P_f P_e)^K \\ Q_m = (P_m(1-P_e) + (1-P_m)P_e)^K \end{cases} \quad (18)$$

where $Q_f$ is furthermore bounded by:

$$Q_f \geq \overline{Q}_f \stackrel{\Delta}{=} \lim_{P_f \to 0} Q_f = 1 - (1-P_e)^K \approx KP_e, \quad (19)$$

because by substituting $P_{f,i} = P_f$ and $P_{m,i} = P_m$ for all i=1, ..., K, into Eq. 10 and Eq. 11, Eq. 18 results. Therefore, for any given $P_e$ and K, the minimization of $Q_f$ is equivalent to the maximization of:

$$(1-P_f)(1-P_e)+P_f P_e = (1-P_e)-P_f(1-2P_e),$$

from Eq. 18. For $P_e < 0.5$, $Q_f$ linearly increases with $P_f$, and hence:

$$\min Q_f = \lim_{P_f \to 0} Q_f = 1-(1-P_e)^K \approx KP_e, \quad (20)$$

where the approximation in Eq. 20 is valid for $P_e \ll 1$.

Figure 6:
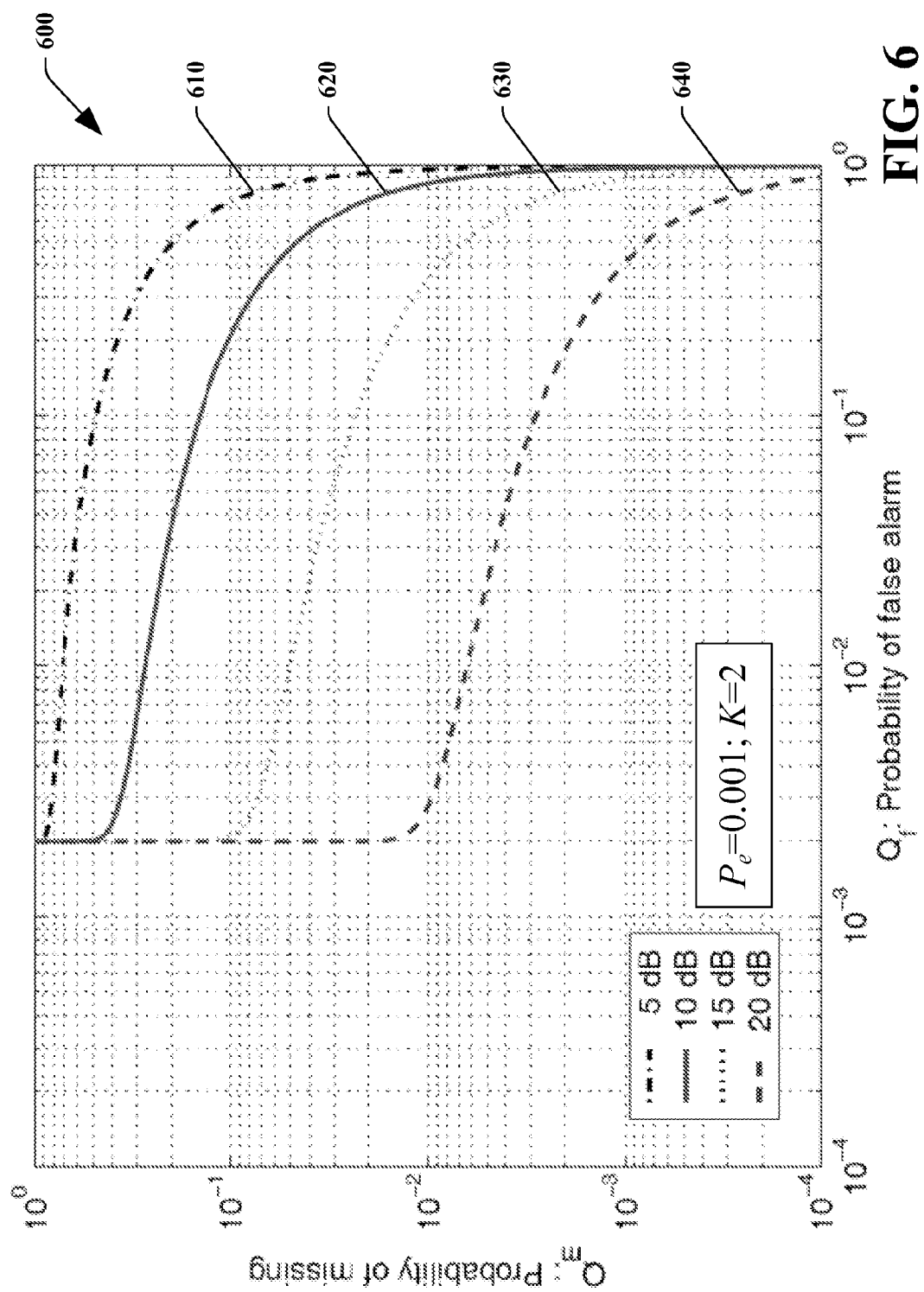
FIG. 6-8 illustrates a plot of the cooperative spectrum sensing error probabilities $Q_m$ and $Q_f$ in accordance with an aspect of the disclosed subject matter.
Figure 7:
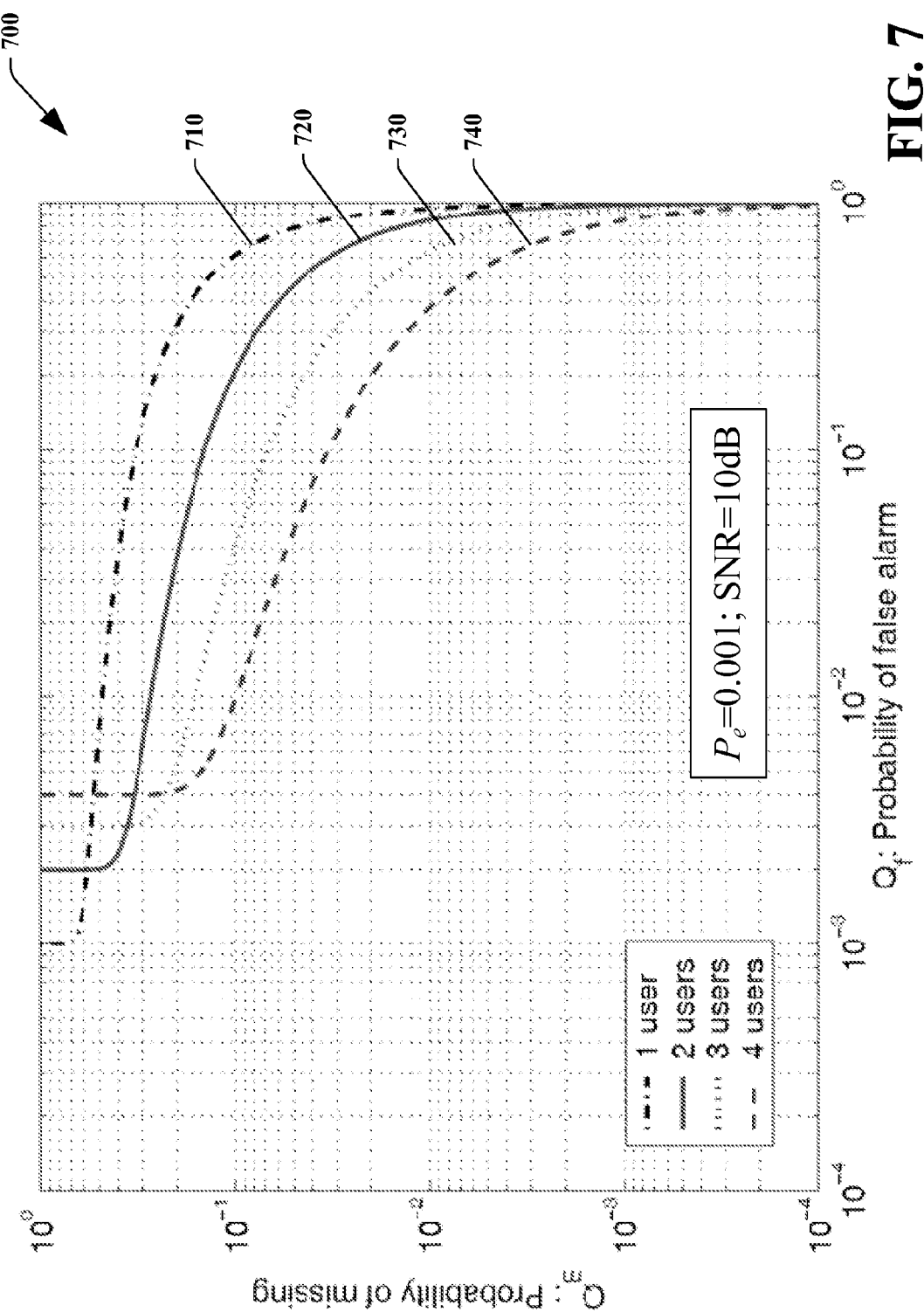
Figure 8:
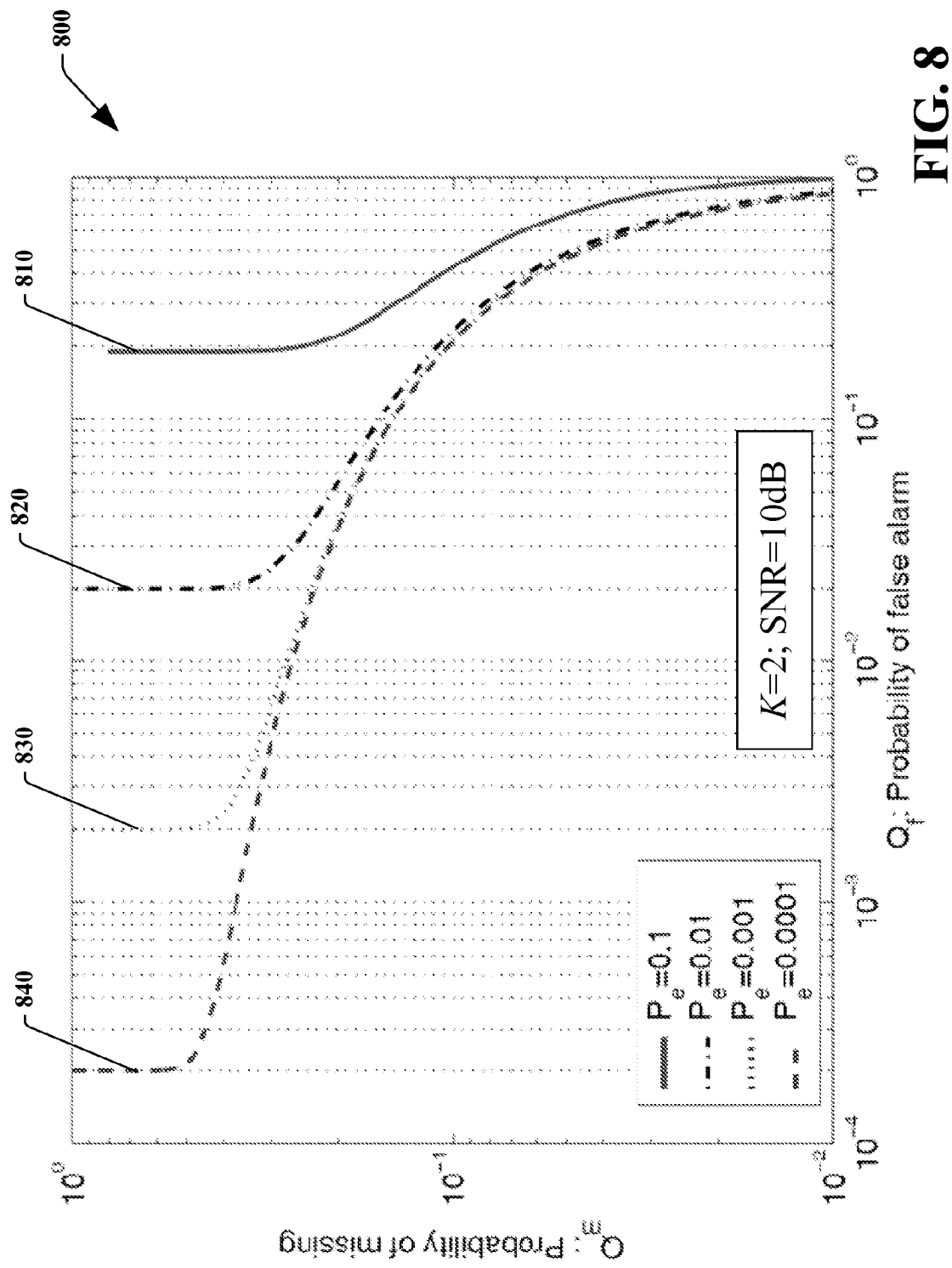

Referring to FIGS. 6-8 illustrated are plots of the cooperative spectrum sensing error probabilities $Q_m$ and $Q_f$ from Eq. 18 with the following parameters: SNR $\bar{\gamma}=5, 10, 15, 20$ dB (FIG. 6); K=1, 2, 3, 4 (FIG. 7); and $P_e=10^{-1}, 10^{-2}, 10^{-3}, 10^{-4}$ (FIG. 8).

In FIG. 6, the effect of reporting channel 130, 330 SNR is illustrated by plotting 600 the cooperative spectrum sensing error probabilities $Q_m$ and $Q_f$ from Eq. 18 with two (e.g., K=2) cognitive radios 230 (e.g., sensing components 110, 310) reporting over a reporting channel 130, 330 having a probability of error $P_e$ of 0.001. This results in $Q_f$ being limited by a lower bound and that the bound does not depend on the reporting channel 130, 330 SNR (e.g., consistent with Eq. 19). Thus, the bound depends on K and $P_e$ only. At 610, the SNR=5 dB. At 620, the SNR=10 dB. At 630, the SNR=15 dB. At 640, the SNR=20 dB. It is clear from the plot 600 that the lower bound of $Q_f$ remains the same for each different SNR.

In FIG. 7, the effect of the number of cognitive radios 230 (e.g., sensing components 110, 310) reporting in the network is illustrated 700 by plotting the cooperative spectrum sensing error probabilities $Q_m$ and $Q_f$ from Eq. 18 with a SNR $\bar{\gamma}=10$ dB in report signals communicated over a reporting channel 130, 330 having a probability of error $P_e$ of 0.001. At 710, the number of users is 1 (e.g., K=1). At 720, the number of users is 2 (e.g., K=2). At 730, the number of users is 3 (e.g., K=3). At 740, the number of users is 4 (e.g., K=4). A generally better performance results for an increasing number of sensing components 110, 310 reporting back to a common receiver 250. However, as $Q_f$ decreases to the lower bound, $Q_m$ (the probability of missed detection) goes to unity and thus, the probability of detection will reach 0. Therefore, cooperative spectrum sensing can be impractical where $Q_f = \overline{Q}_f$. Because $\overline{Q}_f$ increases with the number of sensing components 110, 310 (e.g., cognitive radios 230), a large number of sensing components 110, 310 can result in drastically lower probabilities of detection for imperfect reporting channels 130, 330.

In FIG. 8, the effect of the reporting error probability is illustrated 800 by plotting the cooperative spectrum sensing error probabilities $Q_m$ and $Q_f$ from Eq. 18 with two (e.g., K=2) cognitive radios 230 (e.g., sensing components 110, 310) reporting at a SNR $\bar{\gamma}$=10 dB over a reporting channel 130, 330. At 810, $P_e$=0.1. At 820, $P_e$=0.01. At 830, $P_e$=0.001. At 840, $P_e$=0.001. At 850, $P_e$=0.0001. This clearly illustrates that as the reporting error probability increases the number of false reports rapidly increases (e.g., the common receiver 250 determines that the PU is occupying the spectral band when in fact the PU is not). This is a form of bandwidth efficiency loss and increases as the reporting error probability increases for imperfect reporting channels 130, 330.

As shown in FIGS. 6-8, increasing the number of reporting sensing components 110, 310 can improve the detection probability over realistic reporting channels 130, 330. However the improvement is limited by the error reporting probability $P_e$ resulting from imperfect reporting channels 130, 330. Transmit diversity can be employed to improve the performance of cooperative spectrum sensing by reducing $P_e$. Transmit diversity can be accomplished, for example, by space-time (ST) coding over flat fading reporting channels 130, 330 and/or by space-frequency (SF) coding over frequency-selective fading reporting channels 130, 330, in accordance with an aspect of the disclosed subject matter.

Over flat fading reporting channels 130, 330, employing TDMA protocol, where K sensing components 110, 310 report to a common receiver 250, the transmission can be described as a binary hypothesis testing problem where the $i^{th}$ decision reported to the common receiver 250 is $D_i \in \{H_0, H_1\}$. For all decisions from the sensing components 110, 310 to arrive at the common receiver 250 according to TDMA protocol without interference, the transmission for K=2 sensing components 110,310 can be described as:

$$(^{D_1}{}_{D_2}) \rightarrow \text{space} \downarrow \text{time}.$$

Where the $i^{th}$ decision reported goes through a flat fading reporting channel 130, 330 to the common receiver 250 (e.g., determination component 140, 340) the common receiver 250 can decode the decision (e.g., the symbol) before decision fusing and making a determination on the appropriateness of a SU employing a PU's spectral band as described herein. Each symbol can be decoded independently, thus the reception performance for a plurality of sensing components 110, 310 reporting to a common receiver 250 (e.g., determination components 140, 340) in TDMA protocol is the same as for a single sensing component 110, 310 reporting to the common receiver 250 (e.g., determination components 140, 340). The symbol error rate (SER) for a binary hypothesis testing problem over Rayleigh fading reporting channels is $$P_e^{TDMA} = \frac{1}{2}(1-\mu), \text{ where } \mu = \sqrt{\frac{\bar{\eta}}{1+\bar{\eta}}}. \quad (21)$$

While ST coding can be accomplished with multiple-input multiple-output (MIMO) systems, to provide a high spatial diversity gain to combat channel fading, application of MIMO in each cognitive radio 230 (e.g., sensing device 110, 310) can be cost prohibitive and impractical due to hardware complexity. Cooperative diversity can be employed to accomplish ST coding. Cooperative diversity groups several nodes (e.g., cognitive radios 230, sensing components 110, 310) into clusters to form virtual antenna arrays. This can allow ST coding of the virtual antenna arrays through cooperative diversity to facilitate reducing the error reporting probability $P_e$ resulting from imperfect reporting channels 130, 330.

For example, where K=2 sensing components 110, 310 (e.g., cognitive radios 230) and the local spectrum sensing has been completed at each sensing component 110, 310 with local decisions denoted $D_1$ and $D_2$, instead of transmitting $D_1$ and $D_2$ to the common receiver directly, the two sensing components 110, 310 can be coordinated to form a transmit cluster to which ST coding can be applied. This can allow spatial diversity. Whereas MIMO-type antennas generally do not experience fading when ST coding, transmission between two sensing components 110, 310 in a virtual antenna for ST coding can be across noisy transmission channels resulting in possible error in the ST coding. Therefore, error correction can be incorporated, for example, cyclic redundancy checks (CRCs), for error detection when ST coding in a cluster. In this example, after error checking, a first sensing component 110, 310 can send $\{D_1, D_2\}$ and second sensing component 110, 310 can send $\{-D_2, D_1\}$ to the common receiver 250. Thus, each sensing component 110,310 can act independently and view the other clustered sensing components 110, 310 as relays to achieve cooperative diversity gain. Where error checking fails, the sensing components 110, 310 can opt not to function as a cluster and can individually send reports by TDMA protocol to the common receiver 250. Therefore, each sensing component 110,310 can either form part of a cluster to achieve cooperative diversity gain or can act independently, for example, by employing TDMA protocol, to report without cooperative diversity gain for that particular network element (e.g., any number of other sensing components 110, 310 in a network can cluster to achieve cooperative diversity gain while the remaining sensing components 110, 310 can simply employ TDMA without cooperative diversity gain).

Continuing the example, let C denote the error rate of the transmission between clustering sensing components 110, 310 (e.g., cognitive radios 230). Thus, $\epsilon$ will be equivalent by channel reciprocity for CR1→CR2 and for CR2→CR1. The error rate of binary hypothesis testing problem employing ST block coding can be represented by:

$$P_e^{STBC} = \frac{1}{2}\left[1 - \mu \sum_{i=0}^{N_t-1} \binom{2i}{i}\left(\frac{1-\mu^2}{4}\right)^i\right], \quad (22)$$

where $N_t$ is the number of sensing components 110, 310 in the cluster, $$\mu = \sqrt{\frac{\bar{\eta}}{1+\bar{\eta}}}$$

and $\bar{\eta}$ is the average SNR of the reporting channels 130, 330, normalized by $N_t$. The reporting error rate for ST block coding clusters is thus:

$$P_e = \alpha P_e^{STBS} + (1-\alpha)P_e^{TDMA}, \quad (23)$$

where $\alpha=(1-\epsilon)^2$ and denotes the probability of each of the two sensing components 110, 310 in a cluster each error correcting and correctly decoding the inter-sensing component communication of the local decisions to facilitate forming a virtual antenna.

The reporting error rate for cooperative ST coding (e.g., a virtual antenna with ST coding) is bounded by:

$$P_e^{STBC} \leq P_e \leq P_e^{TDMA}, \quad (24a)$$

where $P_e^{STBC} \leq P_e^{TDMA}$, and therefore (from Eq. 23):

$$P_e \leq \alpha P_e^{TDMA} + (1-\alpha) P_e^{TDMA} = P_e^{TDMA}, \quad (24b)$$

when $\alpha=0$ (corresponding to $\epsilon=1$) when error correction and/or successful decoding of inter-sensing component communication fails, wherein each sensing component 110, 310 can report directly to a common receiver 250 (e.g., determination component 140, 340) in TDMA protocol. Conversely, Eq. 23 can be rewritten, where $\alpha=1$ (corresponding to $\epsilon=0$) and inter-sensing component communication of symbols is perfect, as:

$$P_e = P_e^{STBC} + (1-\alpha)(P_e^{TDMA} - P_e^{STBC}) \geq P_e^{STBC}, \quad (24c)$$

representing error-free inter-sensing component communication. Thus, where $\alpha \to 1$, each sensing component 110, 310 in a cluster can always correctly decode symbols transmitted to it from other sensing components 110, 310 in the cluster. Similarly, where $\alpha \to 0$, each sensing component 110, 310 in a cluster can never correctly decode symbols transmitted to it from other sensing components 110, 310 in the cluster.

Where a cluster has good inter-sensing component communication channels (e.g., low interference and fading between sensing components 110, 310 forming a cluster in a network of sensing components 110, 310 reporting to a common receiver), diversity gain can be achieved where the cluster acts as a virtual antenna. This improvement in diversity gain corresponds to a reduction in reporting error probability to a common receiver 250 (e.g., determination component 140, 340) facilitating determinations about the appropriateness of a SU occupying a PU's spectral band. As a corollary, where a poor inter-sensing component communication channel is present (e.g., higher interference and fading between sensing components 110, 310 forming a cluster in a network of sensing components 110, 310 reporting to a common receiver 250), reporting error $P_e$ will be dominated by the term $(1-\alpha)P_e^{TDMA}$ (see Eq. 23) and true diversity gain (e.g., similar to a physical antenna array such as MIMO, with perfect inter-antenna communication channels) will not be achieved. This however, can result in a reporting error rate no worse than TDMA protocol. For example, where $\alpha \approx 0.5$ (corresponding to $\epsilon=0.3$), a coding gain of only about 3 dB will result, low, but still better than TDMA.

In cases where K>2, sensing components 110, 310 can form a plurality of clusters and/or isolated (e.g., TDMA protocol) sensing components 110, 310. Clustering can be done such as to achieve the most optimal reduction in error reporting to a common receiver 250 (e.g., determination component 140, 340) over reporting channels 130, 330. For example, clustering may be allowed only where $\alpha \approx$ a predetermined level. Collaborative clusters of sensing components 110, 310 in a sensing component network can be controlled by the common receiver 250 (e.g., determination component 140, 340) or can be formed in an ad hoc fashion by negotiating among sensing components 110, 310 (e.g., cognitive radios 230) without centralized control.

Figure 9:
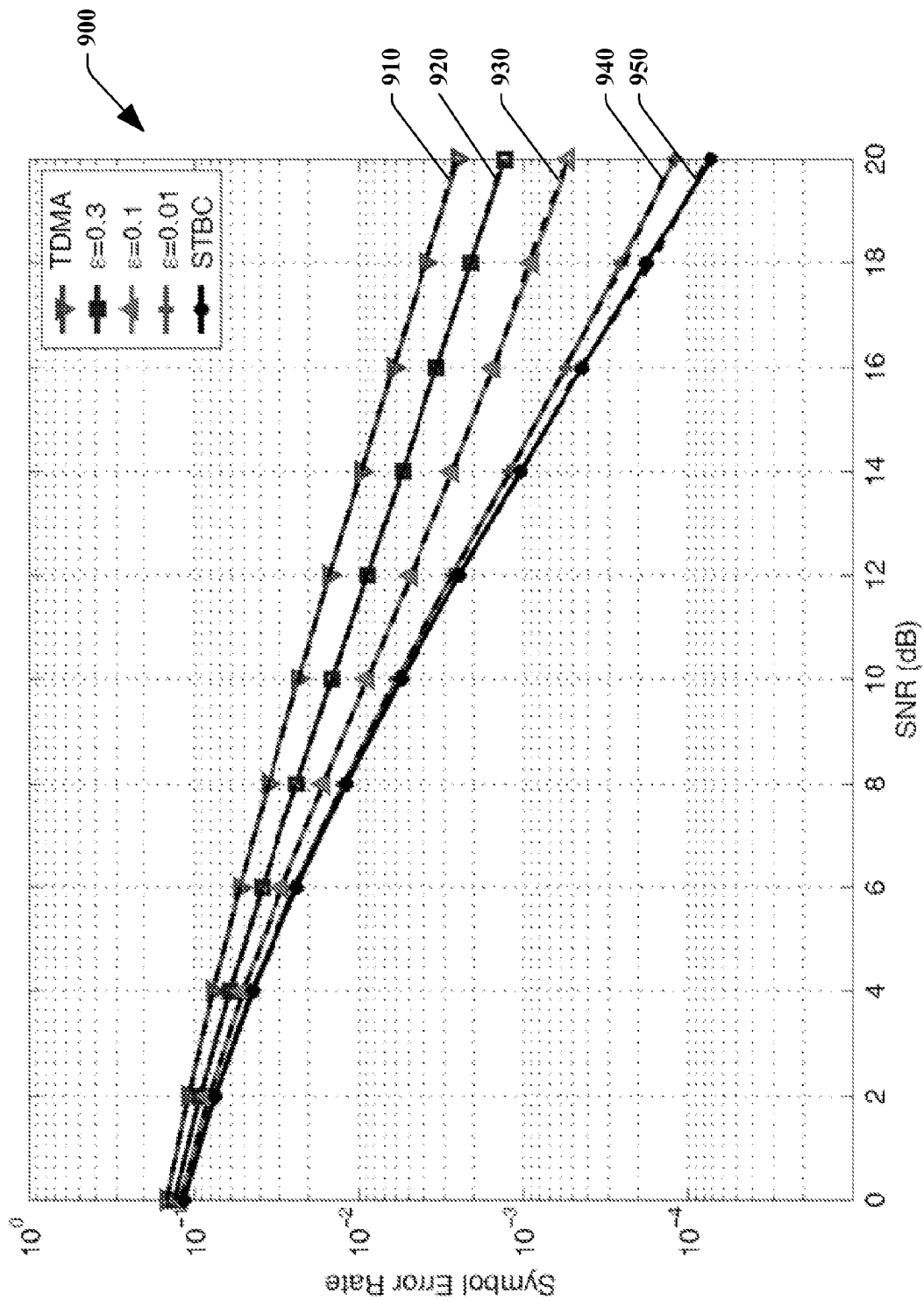
FIG. 9 illustrates a plot of the reporting error rate performance for transmit diversity for different inter-sensing component communication channels in accordance with an aspect of the disclosed subject matter.

Referring to FIG. 9 illustrated is a plot 900 of the reporting error rate performance for transmit diversity for different inter-sensing component communication channels in accordance with an aspect of the disclosed subject matter. At 910, plotted is $\epsilon=0$ (e.g., STBC). At 920, plotted is $\epsilon=0.01$. At 930, plotted is $\epsilon=0.1$. At 940, plotted is $\epsilon=0.3$. At 950, plotted is $\epsilon=1$ (e.g., TDMA). This illustrates that improvements over TDMA in reporting error rates can be achieved by employing ST coding in cooperative spectrum sensing to achieve diversity gain. Further illustrated is that where inter-sensing component communication channels are near ideal, diversity gain for a virtual antenna can approach that of a true spatially distributed antenna, for example, a MIMO antenna, without the significant difficulties of implementing MIMO-type hardware on each sensing component 110, 310 in a network 200.

Figure 10:
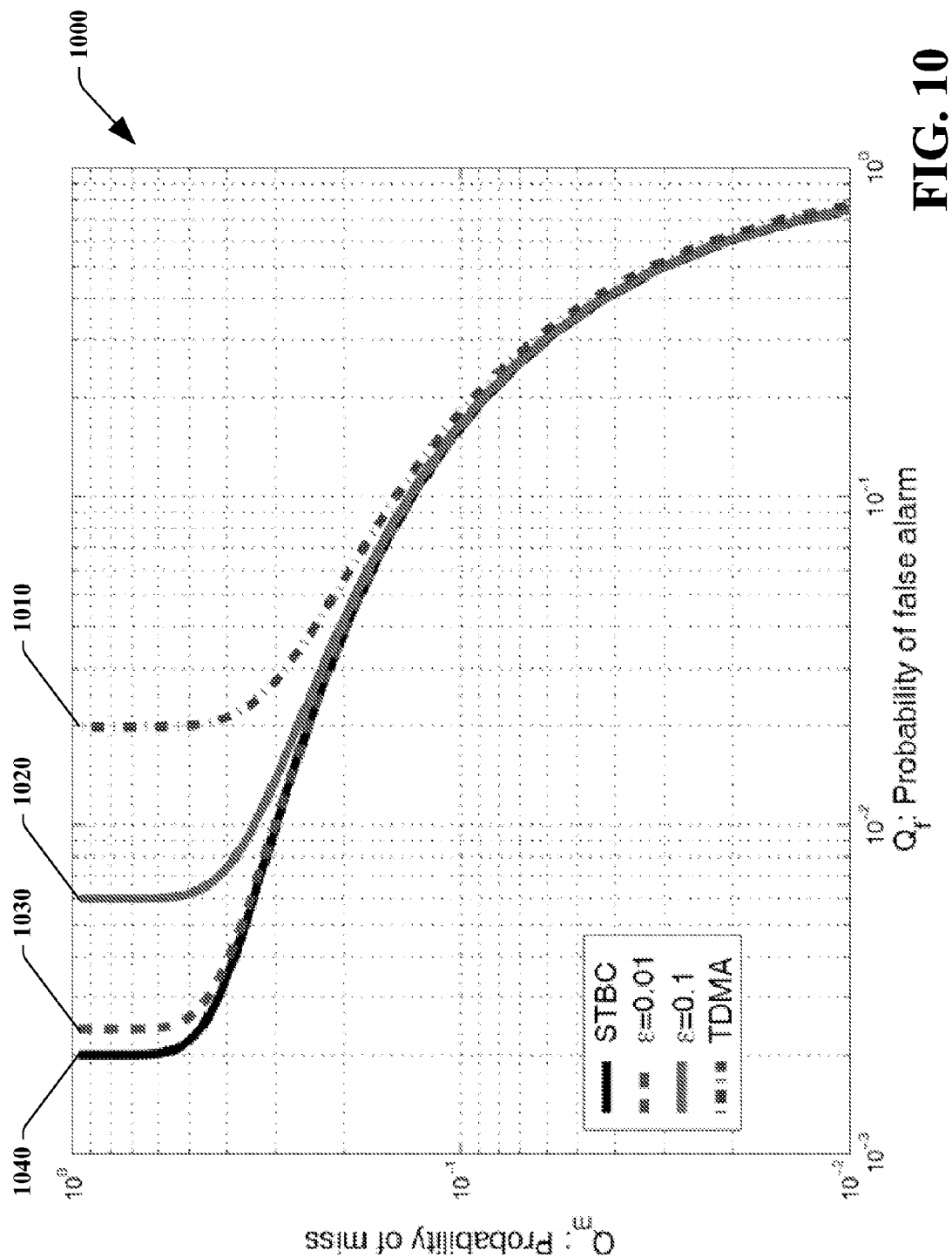
FIG. 10 illustrates a plot of a performance comparison for K=2 cognitive radios against different inter-sensing component communication channels in accordance with an aspect of the disclosed subject matter.

In FIG. 10, illustrated is a performance comparison plot 1000 of cooperative spectrum sensing for K=2 cognitive radios 230 (e.g., sensing components 110, 310) communicating with each other over inter-sensing component communication channels for $\epsilon=0$ (e.g., STBC), 0.01, 0.1, 0.3, and 1 (e.g., TDMA) channel qualities in accordance with an aspect of the disclosed subject matter. At 1010, plotted is $\epsilon=0$ (e.g., STBC). At 1020, plotted is $\epsilon=0.01$. At 1030, plotted is $\epsilon=0.3$. At 1040, plotted is $\epsilon=1$ (e.g., TDMA). The sensing and reporting channels 130, 330 experience Rayleigh fading with an average SNR $\bar{\gamma}=10$ dB and $\bar{\eta}=14$ dB, respectively. It is observable that the ST coding results in a lower bound $\overline{Q}_f$ than TDMA protocol (e.g., $\overline{Q}_f^{STBC} \approx 0.002 < 0.02 \approx \overline{Q}_f^{TDMA}$).

Where frequency-selectivity is present on reporting channels 130, 330, SF coding or orthogonal frequency division multiplexing (OFDM) can be implemented to correct for intersymbol interference in reports communicated to the common receiver 250 (e.g., determination component 140, 340) by the sensing components 110, 310. OFDM can split the frequency-selective fading reporting channels 130, 330 into multiple flat-fading channels. Generally in OFDM for cognitive radio networks 200, a subchannel is assigned to each cognitive radio 230 in the network 200 and different cognitive radios 230 transmit through orthogonal subchannels to overcome intersymbol interference by allowing frequency division multiple access (FDMA). Therefore, for a two cognitive radio 230 system, the FDMA can be denoted as:

$$(^{D_1}{}_{D_2}) \to \text{space} \downarrow \text{subchannel (frequency)}.$$

Therefore, similar to TDMA, FDMA cannot achieve diversity gain where each individual cognitive radio 230 (e.g., sensing component 110, 310) reports through an orthogonal subchannel. By introducing SF coding, spreading codewords over multiple transmit antennas (e.g., in a virtual antenna as described herein) and OFDM subchannels, both space and frequency diversity can be achieved. Where clusters of sensing components 110, 310 (e.g., as disclosed for ST coding) act as a virtual antenna by employing inter-sensing component communication channels, symbols can be SF coded and reported to a common receiver 250 over several OFDM subchannels simultaneously to give diversity gain. An exemplary SF coding of K=2 cognitive radios 230 (e.g., sensing components 110, 310) communicating with each other over inter-sensing component communication channels can be described as:

$$\frac{1}{\sqrt{2}} \begin{pmatrix} D_1 & D_2 \\ -D_2 & D_1 \end{pmatrix} \to \text{space} \downarrow \text{subchannel(frequency)},$$

illustrating that decisions can be reported to a common receiver 250 (e.g., determination component 140, 340) from each cognitive radio 230 (e.g., sensing component 110, 310) over two subchannels simultaneously. In this example, a frequency diversity gain of 2 can be achieved over frequency-selective fading reporting channels 130, 330. Therefore, reducing the reporting error probability by employing SF coding can enhance cooperative spectrum sensing performance in a manner similar to that seen for ST coding as herein disclosed.

Cooperative spectrum sensing can also be improved by employing relay diversity. Where some sensing components 110, 310 cannot efficiently report to a common receiver 250 (e.g., determination component 140, 340) due to interference on reporting channels 130, 330, for example, heavy shadowing between a cognitive radio 230 and the common receiver 250 in FIG. 2, the sensing diversity order can be reduced wherein the common receiver 250 does not receive the sensing report from the heavily shadowed sensing component 110, 310. In accordance with an aspect of the disclosed subject matter, the "missing report" can be relayed through another reporting component 120, 320 to the common receiver 250 (e.g., determination component 140, 340). Further, an algebraic coding approach can be employed in relay diversity to further facilitate improved cooperative spectrum sensing.

Where the power of a reporting signal transmitted to a common receiver 250 (e.g., determination component 140, 340) is below a predetermined threshold, reports from that reporting component 120, 320 can be treated as unreliable. Where a reporting component 120, 320 is determined to be unreliable, the sensing component 110, 310 reporting though the unreliable reporting component 120, 320, can be instructed to report through a different reporting component 120, 320 having a better reporting channel 130, 330. Where the second (e.g., the good) reporting component 120, 320 now must transmit the decision of two sensing components 110, 310, the two decisions to be reported can be reported to the common receiver 250 on two orthogonal subchannels to avoid symbol interference. Thus, where $D_i$ is the report symbol, $H_i(m_i)$ is the reporting subchannel for the $i^{th}$ cognitive radio 230 (e.g., sensing component 110, 310 and reporting component 120, 320), $D_j$ is the report symbol, $H_j(m_j)$ is the reporting subchannel for the $j^{th}$ cognitive radio 230 (e.g., sensing component 110, 310 and reporting component 120, 320), and $m_i \neq m_j$ for $i \neq j$, if the $i^{th}$ cognitive radio 230 (e.g., sensing component 110, 310) relays $D_i$ through the $j^{th}$ cognitive radio (e.g., reporting component 120, 320), the decisions $D_i$ and $D_j$ can be reported to a common receiver 250 simultaneously through subchannels $H_j(m_i)$ and $H_j(m_j)$, respectively, as $$\begin{pmatrix} D_i \to H_j(m_i) \\ D_j \to H_j(m_j) \end{pmatrix}$$

at the $j^{th}$ cognitive radio 230 (e.g., reporting component 120, 320) only.

Thus, the relay-assisted spectrum sensing is the same as, or similar to, full cooperation FDMA as described herein. Therefore, where M of K cognitive radios 230 (e.g., reporting components 120, 320) experience interference beyond a predetermined threshold (e.g., heavy shadowing), without relay diversity there would be a sensing diversity order of cooperative spectrum sensing of (K-M). However, where relay diversity is implemented, a sensing diversity order of K can be maintained by relaying the M reports to other cognitive radios 230 (e.g., reporting components 120, 320) such that all K decisions are reported over K orthogonal subchannels among the (K-M) reliable cognitive radios 230 (e.g., reporting components 120, 320).

Where relay diversity is employed, the lower bound $\overline{Q}_f$ increases with the sensing diversity order (see Eq. 19). To reduce $\overline{Q}_f$ while still achieving a maximal sensing diversity order, algebraic coding can be employed in combination with relay diversity. Algebraic encoding employs a rotational matrix $\Theta$ to rotate the signal constellation resulting from employing relay diversity. Using the example above, for relay diversity, the two decisions $D_i$ and $D_j$ can be encoded as $[C_i \ C_j]^J = \Theta [D_i \ D_j]^J$ where $\Theta$ is a 2×2 rotation matrix and the superscript J indicates a transpose operation. Thus, $C_i$ and $C_j$ can be sent through orthogonal reporting subchannels $H_j(m_i)$ and $H_j(m_j)$, respectively, as:

$$\begin{pmatrix} C_i \to H_j(m_i) \\ C_j \to H_j(m_j) \end{pmatrix}$$

at the $j^{th}$ cognitive radio 230 (e.g., reporting component 120, 320) only. At the common receiver 250 (e.g., determination component 140, 340) the jointly received symbols can be jointly decoded and passed to decision fusion to facilitate determining the appropriateness of a SU occupying the spectral band of a PU.

The rotational matrix $\Theta$ can be crafted to achieve a full diversity of codewords $C_K$ for K sensing components 110, 310. In the current example, the rotational matrix $\Theta$ rotates $[D_i \ D_j]$ into diverse codewords $[C_i \ C_j]$ over Rayleigh fading channels. Thus, the exemplary rotational matrix $\Theta$ can be given by:

$$\Theta = \frac{1}{\sqrt{2}} \begin{pmatrix} 1 & e^{j\pi/4} \\ 1 & e^{j5\pi/4} \end{pmatrix}, \tag{25}$$

which gives a diversity order of 2 over Rayleigh fading channels. This can result in reducing the reporting error probability and thereby lowering the lower bound $\overline{Q}_f$ in relay diversity for cooperative spectrum sensing.

Figure 11:
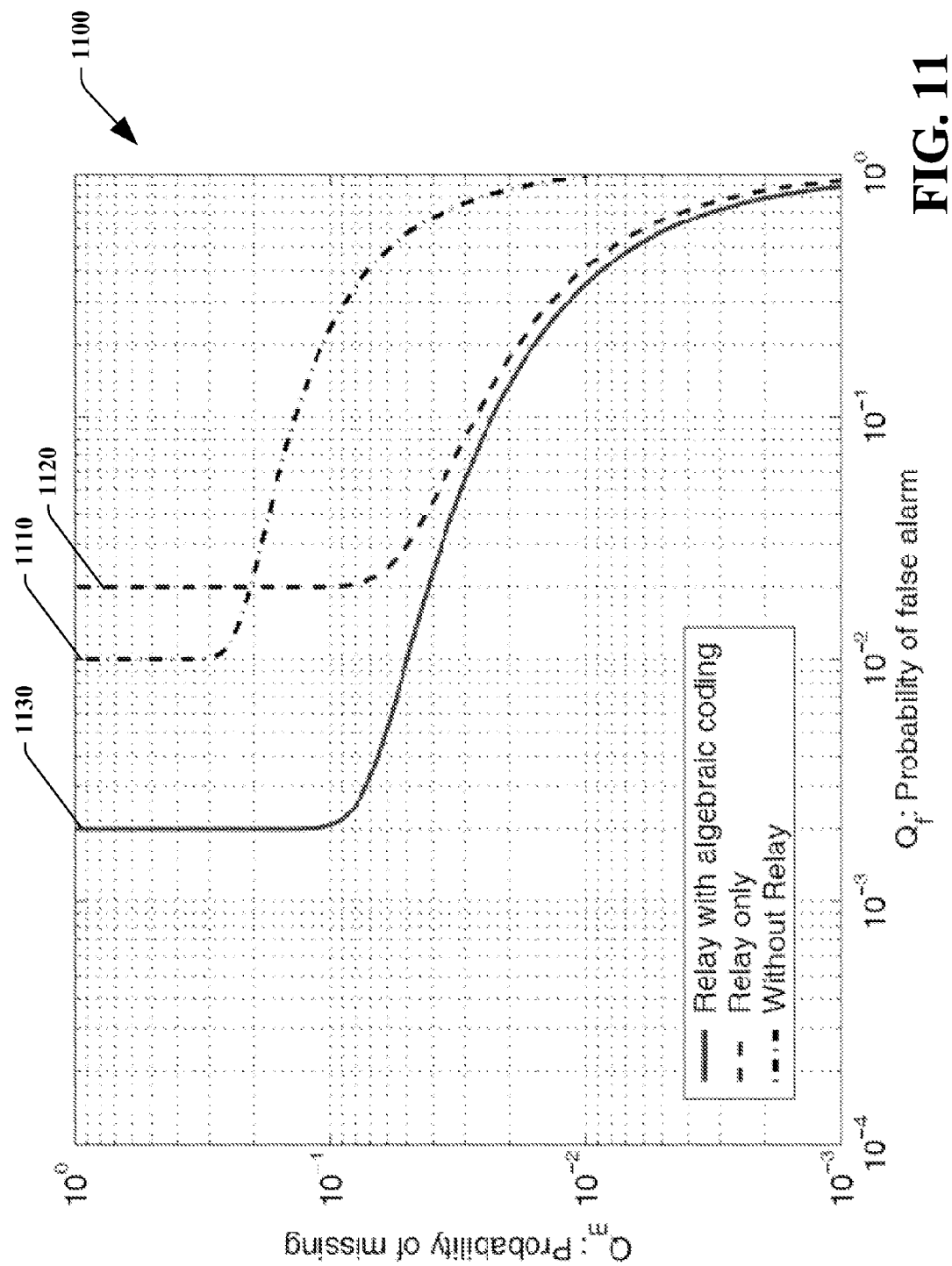
FIG. 11 illustrates the performance of cooperative spectrum sensing with relay diversity and algebraic coding for K=2 cognitive radios in accordance with an aspect of the disclosed subject matter.

In FIG. 11, illustrated is a plot 1100 of the performance of cooperative spectrum sensing with relay diversity and algebraic coding for K=2 cognitive radios 230 (e.g., sensing components 110, 310, reporting components 120, 320) in accordance with an aspect of the disclosed subject matter. At 1110, cooperative spectrum sensing without relay is plotted. At 1120, cooperative spectrum sensing with relay but without algebraic coding is plotted. At 1130, cooperative spectrum sensing with algebraic coding and relay is plotted. The average SNRs of the sensing channels for the two cognitive radios is $\overline{\gamma}$=15 dB, the average SNR for the $i^{th}$ reporting channel 130, 330 is $\overline{\eta}$=14 dB, and the $j^{th}$ reporting channel 130, 330 is treated as unreliable, as herein disclosed. Also plotted, for comparison, are a non-relay diversity curve and a relay diversity without algebraic coding curve. It is therefore illustrated that without relay diversity, the loss in the non-reporting $j^{th}$ sensing component 110, 310 results in a loss of sensing diversity order and therefore the loss of cooperative spectrum sensing. It is further illustrated that employing algebraic coding achieves improvement from an improved sensing diversity order while having a lower $\overline{Q}_f$ than would be achieved without algebraic coding.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components.

Further yet, one or more components and/or sub-components may be combined into a single component providing aggregate functionality. The components may also interact with one or more other components not specifically described herein for the sake of brevity, but known by those of skill in the art.

FIGS. 12-15 illustrate methodologies and/or flow diagrams in accordance with the disclosed subject matter. For simplicity of explanation, the methodologies are depicted and described as a series of acts. It is to be understood and appreciated that the various embodiments of the subject disclosure is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states by way of state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, can encompass a computer program accessible from any computer-readable device, carrier, or media.

Figure 12:
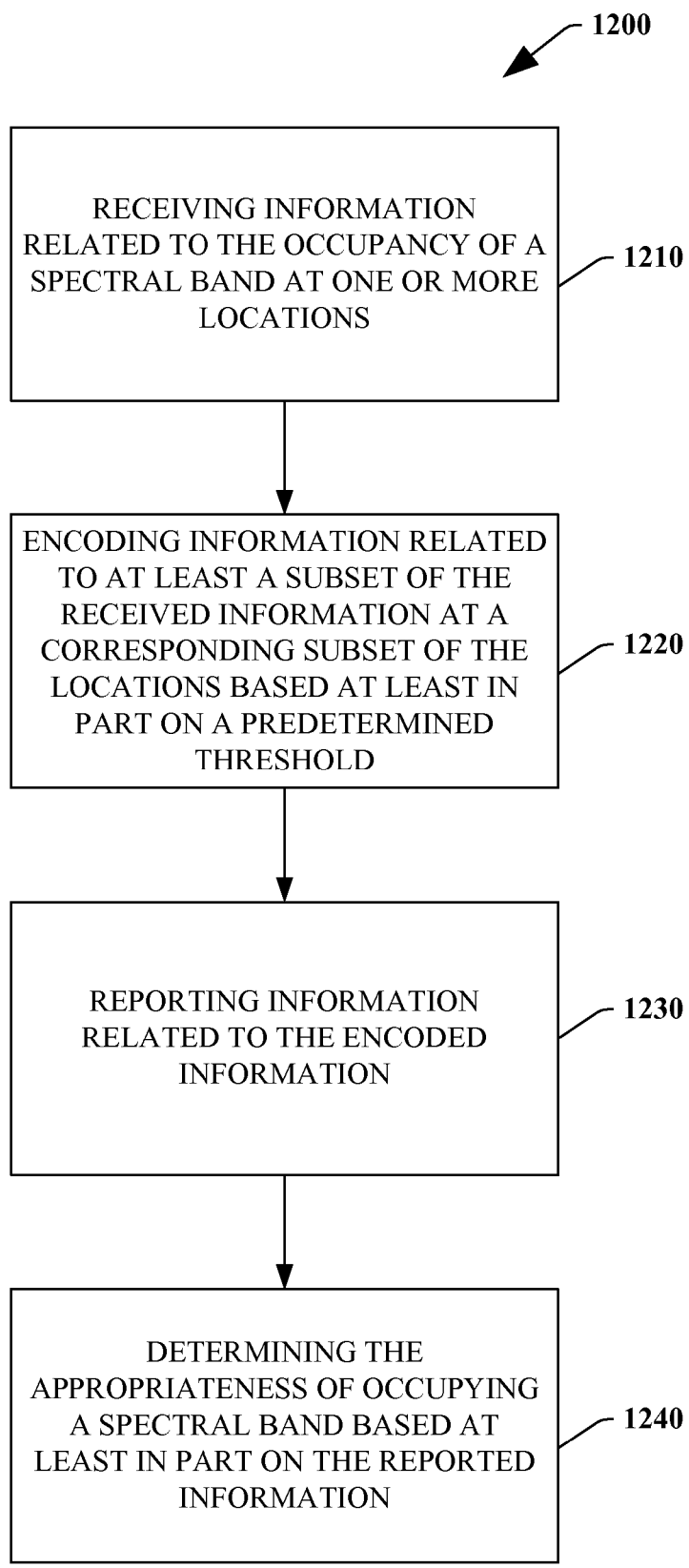
FIG. 12 illustrates a methodology that facilitates determining the appropriateness of occupying a spectral band in accordance with an aspect of the disclosed subject matter.

Turning to FIG. 12, depicted is a methodology 1200 that facilitates determining the appropriateness of occupying a spectral band in accordance with an aspect of the disclosed subject matter. At 1210, information relating to the occupancy of a spectral band can be received. The received information can be generated, for example, by a sensing component 110, 310, such as an energy detector, for example. The information can be related to a primary user (PU) transmitting or otherwise using a frequency band. For example, where a VHF band has been allocated to a TV broadcaster, the received information can be related to the occupancy of the frequency band by the TV broadcaster or other parties using the same frequency band.

At 1220, information related to the received information can be encoded. The received information can be directly encoded or can first be transformed into a representative symbol before encoding. For example, where the information related to occupancy of the spectral band contains frequency and time information, this information can be directly digitally encoded. Further for example, a decision can be made relating to the received occupancy information such that a symbol related to the information is generated for encoding, for example, it can be decided that the occupancy information relates to a PU using the spectral band such that a binary "1" is generated for encoding, and conversely, it can be decided that the occupancy information relates to a PU not using the spectral band such that a binary "−1" is generated for encoding. One of skill in the art will appreciate that any number of data manipulations and determinations can be made prior to encoding, and that all such permutations are considered within the scope of the various embodiments of the subject disclosure where information is encoded that is related to the received information which is related to the occupancy of a spectral band. The encoding can also be ST coding or SF coding of raw occupancy information or transformed occupancy information as herein described.

Further, the occupancy information to be encoded can be related to a subset of the received occupancy information corresponding to the subset of locations at which the occupancy information was received. Thus, for example, where occupancy information is received at a first, second and third cognitive radio, information related to occupancy can be encoded, for example, at only the first and third cognitive radio, while information from the second cognitive radio is not encoded. Thus, as described at length herein, where ST coding or SF coding is to be employed, the encoding is done where a sufficient level of confidence is met, measured against a predetermined threshold, for example, indicating that the first cognitive radio has confidence that the third cognitive radio will report the correct encoded information and similarly that the third cognitive radio has confidence that the first cognitive radio will report the correct encoded information. Where this level of confidence is not met, information can be reported to a common receiver without the benefit of ST coding or SF coding by, for example, TDMA or FDMA protocol reporting. The level of confidence can be based in part on inter-sensing component 110, 310 channel strength, error correction code processes, and/or on inferences formed about the relative confidence that correct encoded information will be reported. Inferences can be formed by artificial intelligence systems and methods as herein described.

At 1230, information related to the encoded information is reported. The information can be directly or indirectly reported to a common receiver (e.g., determination component 140, 340, common receiver 250, . . . ) as herein described. Further, the information can be reported to other components in systems 100, 200, 300 or the like, capable of relaying the information on to a common receiver. Further, where information related to the encoded information is relayed to a common receiver, algebraic encoding can be implemented as herein described.

At 1240, a determination can be made relating to the appropriateness of occupying the spectral band. For example, it can be determined from the reported information that a PU is occupying the spectral band and that it would therefore be inappropriate for another user to simultaneously occupy the PU's spectral band. Similarly, it can be determined from the reported information that a PU is not occupying the spectral band and that it would be appropriate for a SU to occupy the unused spectral band. At this point the methodology 1200 can end.

Figure 13:
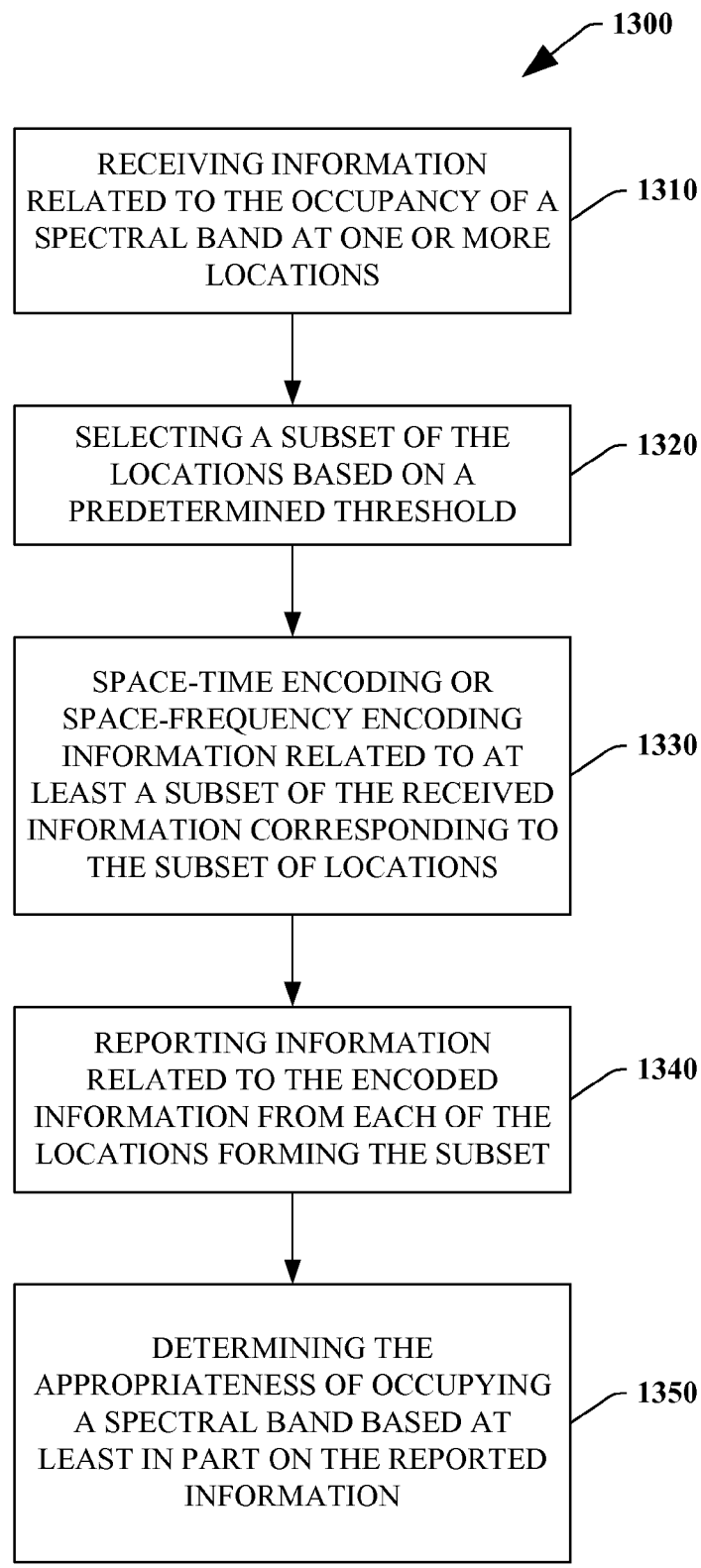
FIG. 13 illustrates a methodology that facilitates determining the appropriateness of occupying a spectral band in accordance with an aspect of the disclosed subject matter.

Referring to FIG. 13, depicted is a methodology 1300 that facilitates determining the appropriateness of occupying a spectral band in accordance with an aspect of the disclosed subject matter. At 1310, information relating to the occupancy of a spectral band can be received. The received information can be generated, for example, by a sensing component 110, 310, such as an energy detector, for example. The information can be related to a primary user (PU) transmitting or otherwise using a frequency band. For example, where a VHF band has been allocated to a TV broadcaster, the received information can be related to the occupancy of the frequency band by the TV broadcaster or other parties using the same frequency band.

At 1320, a subset of the locations receiving occupancy information can be selected based on a predetermined threshold. This threshold can be, for example a confidence level as described herein, that information will be correctly encoded and reported. At 1330, received occupancy information related to the selected subset of locations can be encoded by ST coding or SF coding as herein described. At 1340, information relating to the encoded information can be reported from each of the locations in the selected subset of locations. Thus, for example, where two cognitive radios 230 have sufficient confidence that the other cognitive radio 230 will properly encode and report information related to occupancy information, each of the two cognitive radios 230 can then ST encode or SF encode information relating to the occupancy information and each report it to, for example, a common receiver 250, as herein described.

At 1350, a determination can be made relating to the appropriateness of occupying a spectral band, based at least in part on the reported information. At this point, methodology 1300 can end.

Figure 14:
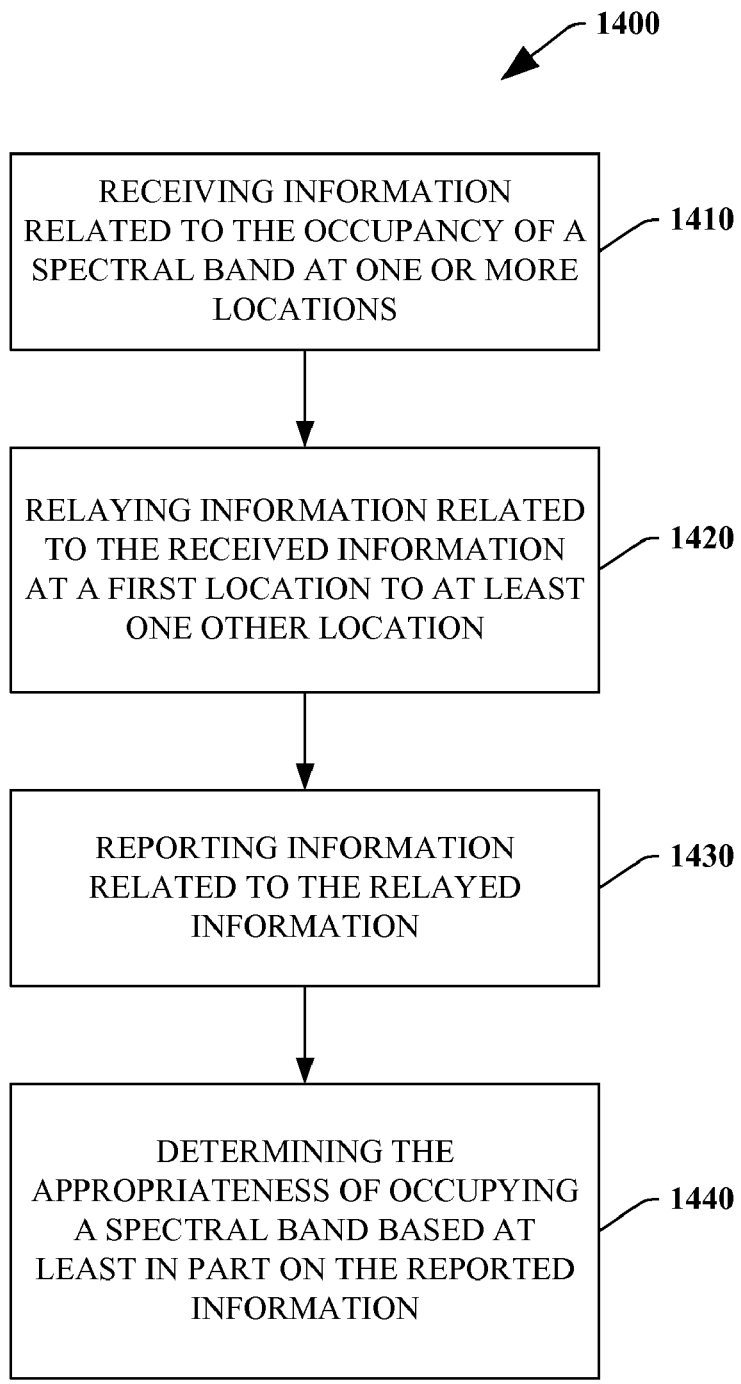
FIG. 14 illustrates a methodology that facilitates determining the appropriateness of occupying a spectral band in accordance with an aspect of the disclosed subject matter.

FIG. 14 depicts a methodology 1400 that facilitates determining the appropriateness of occupying a spectral band in accordance with an aspect of the disclosed subject matter. At 1410, information relating to the occupancy of a spectral band can be received. The received information can be generated, for example, by a sensing component 110, 310, such as an energy detector, for example. The information can be related to a primary user (PU) transmitting or otherwise using a frequency band. For example, where a VHF band has been allocated to a TV broadcaster, the received information can be related to the occupancy of the frequency band by the TV broadcaster or other parties using the same frequency band.

At 1420, information related to the received occupancy information can be relayed from a first location to at least one other location. For example, where occupancy information is received at a first cognitive radio 230 that has a heavily shadowed reporting channel 130, 330, the first cognitive radio 230 can relay information relating to the occupancy information to a second cognitive radio 230. At 1430, information relating to the relayed information can be reported. For example, where the second cognitive radio 230 receives information relating to occupancy from the first cognitive radio 230 because the first cognitive radio 230 has a heavily shadowed reporting channel 130, 330, the second cognitive radio 230 can report information to, for example, a common receiver 250, related to both the information from the first and second cognitive radios 230 and the occupancy information related to their respective locations.

At 1440, a determination can be made relating to the appropriateness of occupying a spectral band, based at least in part on the reported information. At this point, methodology 1400 can end.

Figure 15:
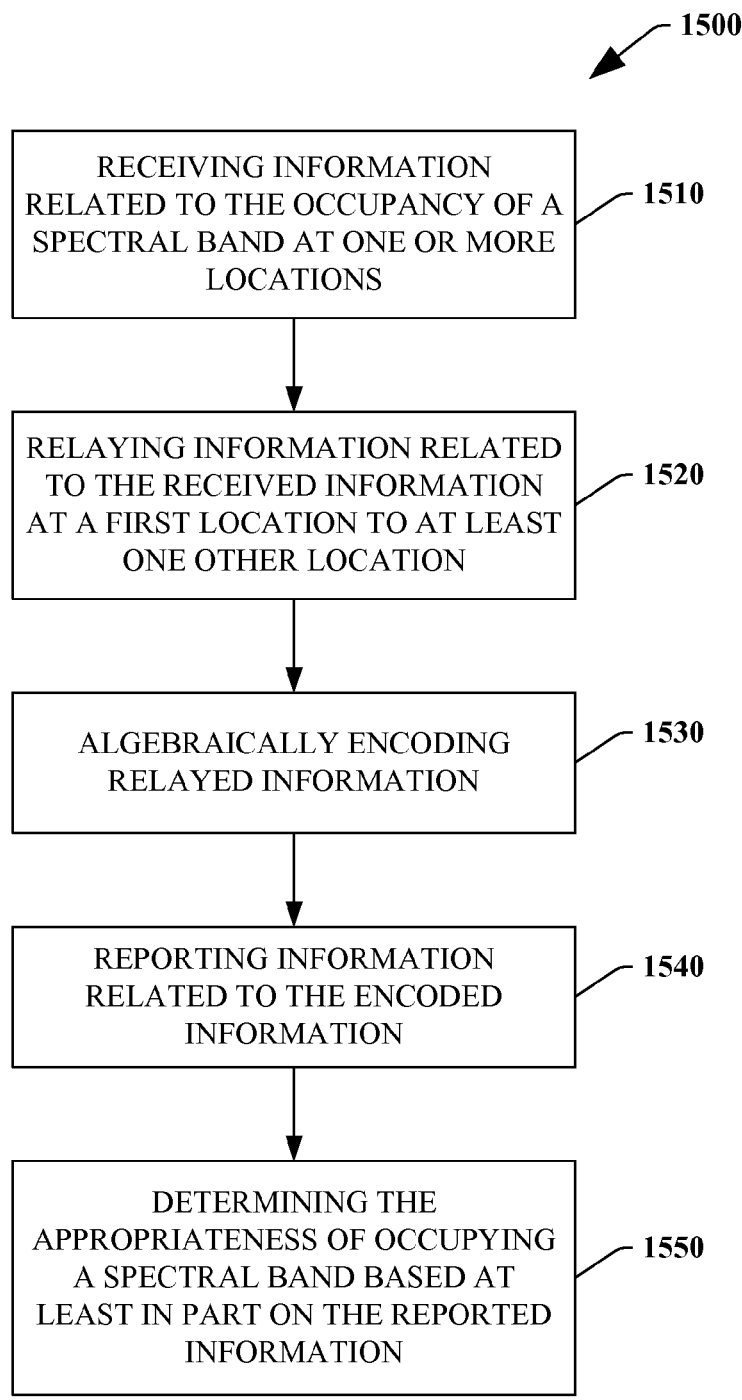
FIG. 15 illustrates a methodology that facilitates determining the appropriateness of occupying a spectral band in accordance with an aspect of the disclosed subject matter.

FIG. 15 depicts a methodology 1500 that facilitates determining the appropriateness of occupying a spectral band in accordance with an aspect of the disclosed subject matter. At 1510, information relating to the occupancy of a spectral band can be received. The received information can be generated, for example, by a sensing component 110, 310, such as an energy detector, for example. The information can be related to a primary user (PU) transmitting or otherwise using a frequency band. For example, where a VHF band has been allocated to a TV broadcaster, the received information can be related to the occupancy of the frequency band by the TV broadcaster or other parties using the same frequency band.

At 1520, information related to the received occupancy information can be relayed from a first location to at least one other location. For example, where occupancy information is received at a first cognitive radio 230 that has a heavily shadowed reporting channel 130, 330, the first cognitive radio 230 can relay information relating to the occupancy information to a second cognitive radio 230.

At 1530, the relayed information can be algebraically encoded as herein described. For example, a rotational matrix $\Theta$ can rotate $[D_i\ D_j]$ into diverse codewords $[C_i\ C_j]$. At 1540, information relating to the algebraically encoded relayed information can be reported. For example, where the second cognitive radio 230 receives information relating to occupancy from the first cognitive radio 230 because the first cognitive radio 230 has a heavily shadowed reporting channel 130, 330, the second cognitive radio 230 can report information to, for example, a common receiver 250, related to the algebraically encoded information from both the first and second cognitive radios 230 and the occupancy information related to their respective locations.

At 1440, a determination can be made relating to the appropriateness of occupying a spectral band, based at least in part on the reported information. At this point, methodology 1500 can end.

Figure 16:
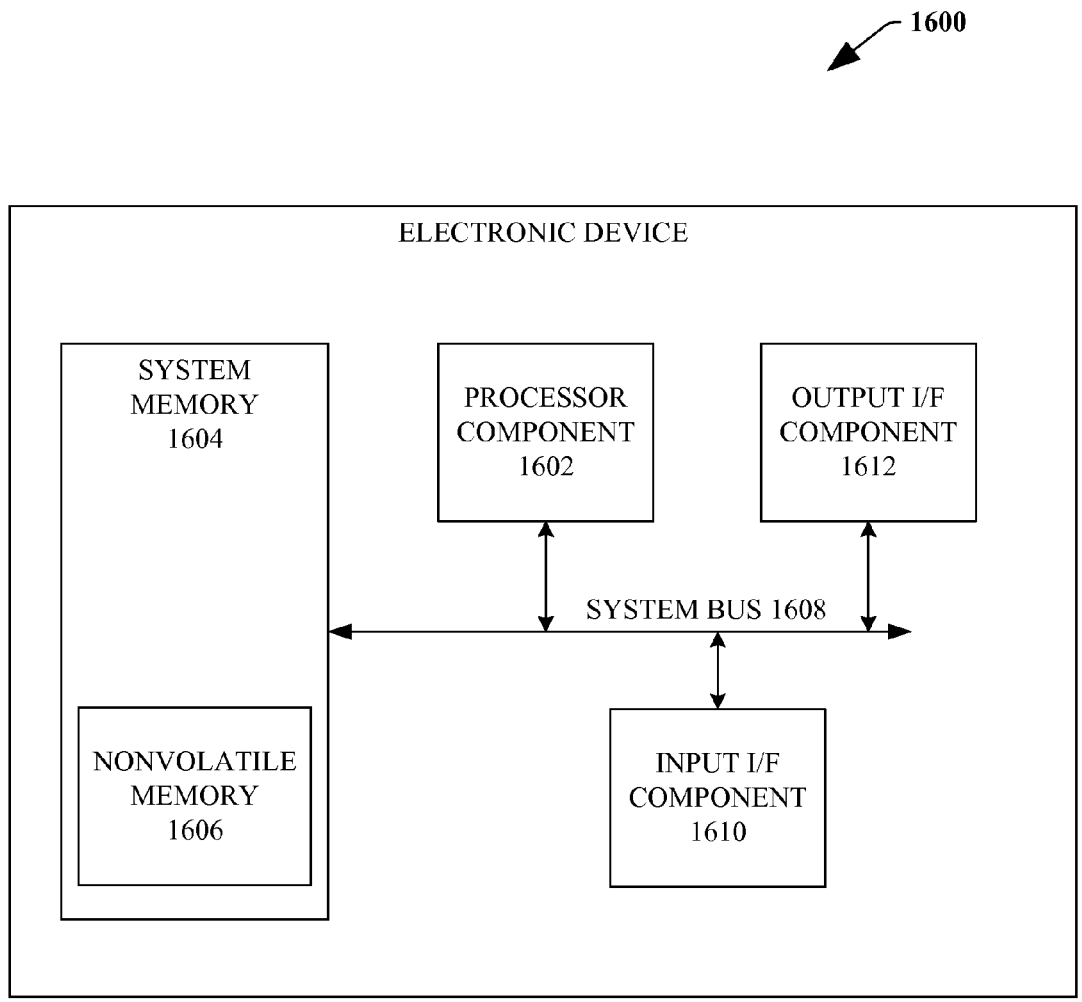
FIG. 16 illustrates a block diagram of an exemplary electronic device that can facilitate determining the appropriateness of occupying a spectral band in accordance with an aspect of the disclosed subject matter.

Referring to FIG. 16, illustrated is a block diagram of an exemplary, non-limiting electronic device 1600 that can utilize cooperative spectrum sensing with transmit and/or relay diversity in accordance with an aspect of the disclosed subject matter. The electronic device 1600 can include, but is not limited to, a computer, a laptop computer, network equipment (e.g. routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), secure memory devices with computational capabilities, devices with a tamper-resistant chip(s), an electronic device associated with an industrial control system, an embedded computer in a machine (e.g., an airplane, a copier, a motor vehicle, a microwave oven), and the like.

Components of the electronic device 1600 can include, but are not limited to, a processor component 1602, a system memory 1604 (with nonvolatile memory 1606), and a system bus 1608 that can couple various system components including the system memory 1604 to the processor component 1602. The system bus 1608 can be any of various types of bus structures including a memory bus or memory controller, a peripheral bus, or a local bus using any of a variety of bus architectures.

Electronic device 1600 can typically include a variety of computer readable media. Computer readable media can be any available media that can be accessed by the electronic device 1600. By way of example, and not limitation, computer readable media can comprise computer storage media and communication media. Computer storage media can include volatile, non-volatile, removable, and non-removable media that can be implemented in any method or technology for storage of information, such as computer readable instructions, data structures, program modules or other data. Computer storage media includes, but is not limited to, RAM, ROM, EEPROM, nonvolatile memory 1606 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1600. Communication media typically can embody computer readable instructions, data structures, program modules or other data in a modulated data signal such as a carrier wave or other transport mechanism and includes any information delivery media.

The system memory 1604 can include computer storage media in the form of volatile and/or nonvolatile memory 1606. A basic input/output system (BIOS), containing the basic routines that help to transfer information between elements within electronic device 1600, such as during start-up, can be stored in memory 1604. Memory 1604 can typically contain data and/or program modules that can be immediately accessible to and/or presently be operated on by processor component 1602. By way of example, and not limitation, system memory 1604 can also include an operating system, application programs, other program modules, and program data.

The nonvolatile memory 1606 can be removable or non-removable. For example, the nonvolatile memory 1606 can be in the form of a removable memory card or a USB flash drive. In accordance with one aspect, the nonvolatile memory 1606 can include flash memory (e.g., single-bit flash memory, multi-bit flash memory), ROM, PROM, EPROM, EEPROM, and/or NVRAM (e.g., FeRAM), or a combination thereof, for example. Further, the flash memory can be comprised of NOR flash memory and/or NAND flash memory.

A user can enter commands and information into the electronic device 1600 through input devices (not illustrated) such as a keypad, microphone, tablet or touch screen although other input devices can also be utilized. These and other input devices can be connected to the processor component 1602 through input interface component 1610 that can be connected to the system bus 1608. Other interface and bus structures, such as a parallel port, game port or a universal serial bus (USB) can also be utilized. A graphics subsystem (not illustrated) can also be connected to the system bus 1608. A display device (not illustrated) can be also connected to the system bus 1608 via an interface, such as output interface component 1612, which can in turn communicate with video memory. In addition to a display, the electronic device 1600 can also include other peripheral output devices such as speakers (not illustrated), which can be connected through output interface component 1612.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description may have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer" or variations in form thereof refers generally to the process of reasoning about or inferring states of the system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

For example, an artificial intelligence based system can evaluate current or historical evidence associated with occupancy of a spectral band (e.g., historical data related to times of most frequent use, times of least use, patterns of use, use by other secondary parties, value of the spectral band, . . . ) and based in part in such evaluation, can render an inference, based in part on probability, regarding, for instance, predicting periods when the spectral band is likely to be unoccupied, preference for occupying different spectral bands based on, for example, transmission distance, power, frequency of use by other secondary users, combinations thereof and others. One of skill in the art will appreciate that intelligent and/or inferential systems can facilitate further optimization of the disclosed subject matter and such inferences can be based on a large plurality of data and variables all of which are considered within the scope of the various embodiments of the subject disclosure.

For instance, one of skill in the art will appreciate that an intelligent component (not illustrated) can be and/or can be part of the intelligence based system and can be included in system 100, 200, and/or 300 to facilitate determining inferences related to determining the occupancy of a spectral band and the appropriateness of secondarily occupying it. For example, an inference can be made, based at least in part on current and/or historic data access, that a primary user will not be occupying the spectral band between 1 A.M. and 7 A.M. and further it can be inferred that secondary use of the spectral band would be efficient between those hours based on the needs of the secondary user (e.g., an online backup of a corporate server can be delayed until an appropriate low congestion spectral band is available), such that occupation of that spectral band can be delayed until that time window and further confirmation that the band is indeed unoccupied at that time. One of skill in the art will appreciate that the number of inferences that can be made is nearly limitless and that all such inferences are to be considered within the scope of the disclosed subject matter.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
    a first device, comprising:
        a first sensing component configured to generate first sensed information related to occupation of a spectral band; and
        a first reporting component which is communicatively coupled to the first sensing component and configured to report the first sensed information; and
    a second device, comprising:
        a second sensing component configured to generate second sensed information related to occupation of the spectral band;
        a second reporting component which is communicatively coupled to the second sensing component and configured to encode the first sensed information and the second sensed information, yielding encoded information, based on a rotational matrix for use, at least in part, in algebraic coding, and to report the encoded information representing the first sensed information and the second sensed information; and
        a determination component configured to determine whether the spectral band can be occupied, based at least in part on decoding and analyzing the encoded information reported by the second reporting component.

2. The system of claim 1, wherein at least one of the first sensing component or the second sensing component comprises an energy detector configured to sense energy over a frequency band and time window.

3. The system of claim 1, wherein at least one of the first sensing component and the second sensing component further comprises a decision component, wherein the decision component is configured to locally decide and reduce a state of spectral band occupancy to a quantized symbolic representation of spectral band occupancy.

4. The system of claim 3, wherein the decision component is further configured to decide and reduce the state of the spectral band occupancy to a quantized symbolic representation of spectral band occupancy, which is embodied in a binary representation system representing at least an occupied state and a not occupied state of the spectral band.

5. The system of claim 1, wherein the second reporting component is further configured to encode the first sensed information and the second sensed information in space-time coding, space-frequency coding, or a combination thereof, at least in part, to increase a transmit diversity.

6. The system of claim 5, wherein the second reporting component is further configured to determine what portion of the first sensed information and the second sensed information to encode based, at least in part, on a predetermined reporting confidence level between at least the first sensing component and the second sensing component.

7. The system of claim 1, wherein the determination component further comprises a fusion component that is configured to fuse the encoded information with other information received from a plurality of reporting components, yielding fused information, to facilitate determinations relating to whether the spectral band can be occupied.

8. The system of claim 7, wherein the determination component further comprises an analysis component configured to determine whether the spectral band can be occupied based, at least in part, on the encoded information, the fused information, inferences formed about occupation of the spectral band, or combinations thereof.

9. The system of claim 1, further comprising:
    a plurality of devices, each device comprising at least one sensing component and at least one related communicatively coupled reporting component; and
    at least a portion of a network of cooperative spectrum sensing devices, wherein at least a subset of the plurality of devices are configured to report information related to the occupation of a spectral band to the determination component by way of space-time coded transmit diversity, space-frequency coded transmit diversity, relay diversity, or algebraically coded relay diversity.

10. The system of claim 9, wherein at least one device of the plurality of devices is a cognitive radio device comprising at least one sensing component and at least one related communicatively coupled reporting component.

11. The system of claim 9, wherein the determination component comprises at least a portion of a cognitive radio device.

12. The system of claim 9, wherein at least one of the plurality of devices comprises a mobile device.

13. A non-transitory computer-readable storage medium containing computer-executable instructions that, in response to execution by a computing device, cause the computing device to perform acts comprising:
  receiving, at a second location, second information related to occupancy of a spectral band at one or more locations;
  receiving, by at least the second location, relayed third information related to at least a portion of first information related to occupancy of the spectral band at the one or more locations received at a first location;
  employing a rotational matrix to algebraically encode fourth information relating to the third information relayed from the first location to the second location and fifth information relating to at least a portion of the second information; and
  reporting, from the second location the fourth information and the fifth information to facilitate determining whether the spectral band is available to be occupied based at least in part on the fourth information and the fifth information.

14. The non-transitory computer-readable storage medium of claim 13, the instructions, in response to execution by a computing device, cause the computing device to perform acts further comprising:
  encoding at least a subset of the fourth information and the fifth information at a corresponding subset of the one or more locations based in part on a predetermined threshold, generating encoded information;
  reporting the encoded information; and
  wherein the determining whether the spectral band is available to occupy includes determining based at least in part on the encoded information.

15. The non-transitory computer-readable storage medium of claim 14, wherein the encoding at least a subset of the fourth information and the fifth information is by space-time coding, space-frequency coding, or combinations thereof.

16. The non-transitory computer-readable storage medium of claim 15, wherein the encoding of the at least the subset of the fourth information and the fifth information includes encoding based at least in part on a predetermined threshold.

17. The non-transitory computer-readable storage medium of claim 16, wherein the encoding based on the predetermined threshold includes encoding based at least in part on an inference relating to a confidence level that the encoded information will be correctly reported.

18. A device for use in a spectrum sensing system, comprising:
  a processor;
  a memory communicatively coupled to the processor, and containing instructions comprising:
    a receiving component configured to receive received information related to the occupancy of a spectral band from a plurality of other devices;
    a sensing component configured to generate sensed information related to the occupation of the spectral band, as sensed at a location of the device;
    a fusing component configured to fuse the sensed information and the received information to form fused information;
    a transformation component configured to transform the fused information using a rotational matrix, for use, at least in part, in algebraic coding to generate transformed information;
    a determination component configured to generate, based at least in part on the transformed information, a determination of whether to occupy the spectral band; and
    a reporting component configured to report the determination of whether to occupy the spectral band.

19. The device of claim 18, wherein the reporting component is further configured to report the transformed information.

20. A system, comprising:
  means for sensing information related to the occupation of a spectral band at a location of a device yielding sensed information;
  means for receiving received information related to the occupancy of the spectral band from at least one other device;
  means for fusing the sensed information and the received information to form fused information;
  means for transforming the fused information using a rotational matrix, for use, at least in part, in algebraic coding to generate transformed information; and
  means for determining, based at least in part on the transformed information, whether to occupy the spectral band.

21. The system of claim 20, further comprising:
  means for detecting energy over a frequency band and time window.

22. The system of claim 20, further comprising:
  means for reporting whether to occupy the spectral band.

23. The system of claim 22, wherein the means for determining includes means for determining a confidence level associated with whether to occupy the spectral band, and wherein the means for reporting reports the confidence level.

* * * * *

UNITED STATES PATENT AND TRADEMARK OFFICE
CERTIFICATE OF CORRECTION

| | | |
|---|---|---|
| PATENT NO. | : 7,965,641 B2 | Page 1 of 1 |
| APPLICATION NO. | : 12/031521 | |
| DATED | : June 21, 2011 | |
| INVENTOR(S) | : Ben Letaief et al. | |

It is certified that error appears in the above-identified patent and that said Letters Patent is hereby corrected as shown below:

Page 1, item (56) under "Other Publications", in Column 2, Line 15, delete "vol." and insert -- vol. 50, pp. 2127-2159, Sep. 2006. --.

Title page, item (57), under "Abstract", in Column 2, Lines 11-12, delete "space time coding and/or space frequency" and insert -- space-time coding and/or space-frequency --.

Page 2, item (56), under "Other Publications", in Column 2, Line 24, delete "selecitve" and insert -- selective --.

Signed and Sealed this
Twenty-fourth Day of January, 2012

David J. Kappos
*Director of the United States Patent and Trademark Office*